(12) United States Patent
Seo et al.

(10) Patent No.: US 11,395,304 B2
(45) Date of Patent: Jul. 19, 2022

(54) METHOD FOR TRANSMITTING OR RECEIVING SIGNAL IN WIRELESS COMMUNICATION SYSTEM AND DEVICE THEREFOR

(71) Applicant: LG ELECTRONICS INC., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 16/955,286

(22) PCT Filed: Jan. 3, 2019

(86) PCT No.: PCT/KR2019/000082
§ 371 (c)(1),
(2) Date: Jun. 18, 2020

(87) PCT Pub. No.: WO2019/139300
PCT Pub. Date: Jul. 18, 2019

(65) Prior Publication Data
US 2020/0404669 A1 Dec. 24, 2020

Related U.S. Application Data

(60) Provisional application No. 62/615,940, filed on Jan. 10, 2018, provisional application No. 62/629,682, filed on Feb. 12, 2018.

(51) Int. Cl.
*H04W 4/00* (2018.01)
*H04W 72/04* (2009.01)
(Continued)

(52) U.S. Cl.
CPC ....... *H04W 72/0493* (2013.01); *H04L 1/0038* (2013.01); *H04L 25/0238* (2013.01);
(Continued)

(58) Field of Classification Search
None
See application file for complete search history.

(56) References Cited

U.S. PATENT DOCUMENTS

2014/0376490 A1 12/2014 McBeath et al.
2018/0235012 A1* 8/2018 Chen ................. H04W 72/0413
(Continued)

FOREIGN PATENT DOCUMENTS

| KR | 1020140121436 A | 10/2014 |
| KR | 1020150029743 A | 3/2015 |
| KR | 1020150090054 A | 8/2015 |

OTHER PUBLICATIONS

"3rd Generation Partnership Project; Technical Specification Group Radio Access Network; Study on New Radio (NR) access technology (Release 14)", 3GPP TR 38.912 V14.1.0 (Jun. 2017).

*Primary Examiner* — Clemence S Han
(74) *Attorney, Agent, or Firm* — Dentons US LLP

(57) ABSTRACT

A method for receiving, by a terminal, a physical downlink control channel (PDCCH) signal in a wireless communication system, according to one embodiment of the present invention, comprises the steps of: determining a complexity of channel estimation required to monitor PDCCH candidates on at least one control resource set (CORESET) in one slot; skipping the monitoring of some of the PDCCH candidates and monitoring only the remaining PDCCH candidates if the determined complexity of the channel estimation exceeds the channel estimation capability of a terminal; and receiving a PDCCH signal on the basis of a result of monitoring the remaining PDCCH candidates, wherein the complexity of the channel estimation may be determined on the basis of the resource element group (REG) bundle size set for each of the at least one CORESET. The UE is capable (Continued)

of communicating with at least one of another UE, a UE related to an autonomous driving vehicle, a base station or a network.

13 Claims, 6 Drawing Sheets

(51) Int. Cl.
*H04W 76/27* (2018.01)
*H04L 1/00* (2006.01)
*H04L 25/02* (2006.01)
*H04W 24/08* (2009.01)

(52) U.S. Cl.
CPC ......... *H04W 24/08* (2013.01); *H04W 72/042* (2013.01); *H04W 72/0446* (2013.01); *H04W 76/27* (2018.02)

(56) References Cited

U.S. PATENT DOCUMENTS

| | | | | |
|---|---|---|---|---|
| 2018/0317231 | A1* | 11/2018 | Wang | H04L 27/0006 |
| 2019/0166593 | A1* | 5/2019 | Liao | H04L 5/0053 |
| 2020/0351924 | A1* | 11/2020 | Seo | H04L 5/0023 |
| 2021/0058908 | A1* | 2/2021 | Lin | H04L 5/0053 |

\* cited by examiner

METHOD FOR TRANSMITTING OR RECEIVING SIGNAL IN WIRELESS COMMUNICATION SYSTEM AND DEVICE THEREFOR

This application is the National Stage filing under 35 U.S.C. 371 of International Application No. PCT/KR2019/000082, filed on Jan. 3, 2019, which claims the benefit of U.S. Provisional Application No. 62/615,940, filed on Jan. 10, 2018 and 62/629,682, filed on Feb. 12, 2018, the contents of which are all hereby incorporated by reference herein in their entirety.

TECHNICAL FIELD

The present disclosure relates to a wireless communication system, and more particularly, to a method of transmitting or receiving a downlink control channel signal by a base station (BS) or a user equipment (UE) in a wireless communication system, and a device for performing the method.

BACKGROUND ART

First, the existing 3GPP LTE/LTE-A system will be briefly described. Referring to FIG. 1, the UE performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell ID. Thereafter, the UE acquires system information (e.g., MIB) through a physical broadcast channel (PBCH). The UE can receive the downlink reference signal (DL RS) and check the downlink channel status.

After the initial cell search, the UE can acquire more detailed system information (e.g., SIBs) by receiving a physical downlink control channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and physical uplink shared channel (PUSCH)/physical uplink control channel (PUCCH) transmission (S108) as a general uplink/downlink signal transmission procedure. The UE can transmit uplink control information (UCI) to the BS. The UCI may include hybrid automatic repeat request acknowledgment/negative acknowledgment (HARQ ACK/NACK), scheduling request (SR), channel quality indicator (CQI), precoding matrix indicator (PMI) and/or rank indicator (RI) etc.

DISCLOSURE

Technical Problem

An aspect of the present disclosure devised to solve the conventional problem is to provide a method and apparatus for more efficiently and accurately transmitting and receiving a physical downlink control channel (PDCCH) signal between a user equipment (UE) and a base station (BS).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, a method of receiving a physical downlink control channel (PDCCH) signal by a user equipment (UE) in a wireless communication system includes determining a channel estimation complexity required for monitoring PDCCH candidates in at least one control resource set (CORESET) during one slot, when the determined channel estimation complexity exceeds a channel estimation capability of the UE, skipping a part of the PDCCH candidates and monitoring only the remaining PDCCH candidates, and receiving a PDCCH signal based on a result of monitoring the remaining PDCCH candidates. The channel estimation complexity is determined based on a resource element group (REG) bundle size configured for each of the at least one CORESET.

According to another aspect of the present disclosure, a method of transmitting a PDCCH signal by a BS in a wireless communication system includes determining a channel estimation complexity required for a UE to monitor PDCCH candidates in at least one CORESET during one slot, when the determined channel estimation complexity exceeds a channel estimation capability of the UE, determining a part of the PDCCH candidates for which the UE skips monitoring and the remaining PDCCH candidates monitored by the UE, and transmitting a PDCCH signal based on one of the remaining PDCCH candidates. The channel estimation complexity is determined based on an REG bundle size configured for each of the at least one CORESET.

According to another aspect of the present disclosure, a UE for receiving a PDCCH signal includes a transceiver and a processor configured to control the transceiver. The processor is configured to determine a channel estimation complexity required for monitoring PDCCH candidates in at least one CORESET during one slot, when the determined channel estimation complexity exceeds a channel estimation capability of the UE, skip a part of the PDCCH candidates and monitor only the remaining PDCCH candidates, and receive a PDCCH signal based on a result of monitoring the remaining PDCCH candidates. The channel estimation complexity is determined based on a resource element group (REG) bundle size configured for each of the at least one CORESET.

According to another aspect of the present disclosure, a BS for transmitting a PDCCH signal includes a transceiver and a processor configured to control the transceiver. The processor is configured to determine a channel estimation complexity required for a UE to monitor PDCCH candidates in at least one CORESET during one slot, when the determined channel estimation complexity exceeds a channel estimation capability of the UE, determine a part of the PDCCH candidates for which the UE skips monitoring and the remaining PDCCH candidates monitored by the UE, and transmit a PDCCH signal based on one of the remaining PDCCH candidates. The channel estimation complexity is determined based on an REG bundle size configured for each of the at least one CORESET.

The channel estimation complexity may be represented as the number of control channel elements (CCEs), and the UE or the BS may count the number of CCEs by applying a weight associated with the REG bundle size.

The UE or the BS may determine the channel estimation complexity differently based on whether each of the at least one CORESET is configured with a wideband (WB) reference signal (RS).

The UE or the BS may determine the channel estimation complexity for the CORESET configured with the WB RS based on at least one of the number of symbols or the number of resource blocks in the CORESET configured with the WB RS.

The UE or the BS may determine the channel estimation complexity for the CORESET configured with the WB RS by applying a weight related to discrete Fourier transform (DFT)-based channel estimation, and the channel estimation complexity for a CORESET not configured with the WB RS by applying a weight related to minimum mean squared error (MMSE)-related channel estimation.

Advantageous Effects

According to an embodiment of the present disclosure, because a network and a user equipment (UE) determine the channel estimation complexity of the UE in consideration of a resource element group (REG) bundle size set for a control resource set (CORESET) during transmission and reception of a physical downlink control channel (PDCCH) signal, the channel estimation complexity of the UE may be more accurately and more efficiently determined than only based on the number of control channel elements (CCEs). Further, the problem of PDCCH transmission/reception failure caused by lack of the channel estimation capability of the UE or a decrease in the efficiency of radio resources caused by underestimation of the channel estimation capability of the UE may be overcome.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
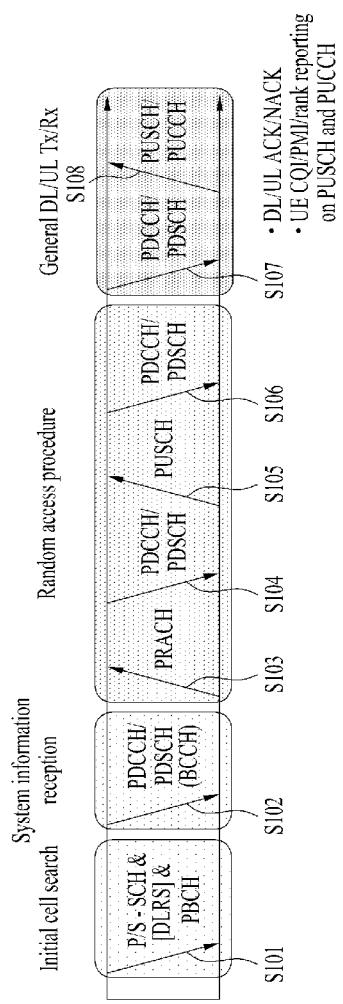
FIG. 1 illustrates physical channels used in 3GPP LTE/LTE-A system and a general signal transmission method using the physical channels.

The following description of embodiments of the present disclosure may apply to various wireless access systems including code division multiple access (CDMA), frequency division multiple access (FDMA), time division multiple access (TDMA), orthogonal frequency division multiple access (OFDMA), single carrier frequency division multiple access (SC-FDMA) and the like. CDMA can be implemented with such a radio technology as universal terrestrial radio access (UTRA), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, evolved UTRA (E-UTRA), etc. UTRA is a part of universal mobile telecommunications system (UMTS). 3rd generation partnership project (3GPP) long term evolution (LTE) is a part of evolved UMTS (E-UMTS) that uses E-UTRA. 3GPP LTE adopts OFDMA in downlink and adopts SC-FDMA in uplink. LTE-advanced (LTE-A) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, p represents OFDM numerology, and $N_{slot}^{subframe,\mu}$ represents the number of slots per subframe with respect to corresponding μ. In NR, multiple OFDM numerologies shown in Table 1 below may be supported.

TABLE 1

| μ | $\Delta f = 2^\mu \cdot 15$[kHz] | Cyclic prefix |
|---|---|---|
| 0 | 15 | Normal |
| 1 | 30 | Normal |

TABLE 1-continued

| μ | Δf = $2^\mu \cdot 15$[kHz] | Cyclic prefix |
|---|---|---|
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station (BS) can signal information on a CORESET to a user equipment (UE). For example, a CORESET configuration is signaled to a UE for each CORESET. The CORESET configuration can include time duration of a CORESET (e.g., 1/2/3 symbols), a frequency domain resource of the CORESET, a precoder granularity, an REG-to-CCE mapping type (e.g., interleaved/non-interleaved), in case of the interleaved REG-to-CCE mapping type, an REG bundling size, an interleaver size, and the like.

If REG-to-CCE mapping for 1-symbol CORESET corresponds to the non-interleaved type, 6 REGs for CCE are grouped as a single REG bundle and the REGs for the CCE are consecutive. If there are multiple CCEs within 1 PDCCH (e.g., when an aggregation level is equal to or greater than 2), the CCEs can be consecutive. A UE may assume the same precoding within 1 REG bundle according to a precoder granularity or assume the same precoding for a plurality of REG bundles.

If REG-to-CCE mapping for 1-symbol CORESET corresponds to the interleaved type, 2, 3, or 6 REGs can be configured as 1 REG bundle. For example, it may be able to support such an REG bundle size as {2},{3}, {2,3}, {2,6}, {3,6}, or {2,3,6} as a subset rather than support all REG bundle sizes of 2, 3, and 6. In case of supporting an REG bundle size of {2,6}, 1 REG bundle can be configured by 2 REGs or 6 REGs. A UE may assume the same precoding within 1 REG bundle or assume the same precoding for a plurality of REGs.

When REG-to-CCE mapping is performed on a CORESET having duration equal to or longer than 2 symbols, it may define an REG bundle in time/frequency domain. If an REG bundle is defined in time domain, all REGs belonging to 1 REG bundle belong to the same RB and the REGs may correspond to symbols different from each other. If an REG bundle is defined in time-frequency domain, 1 REG bundle belongs to the same RB and can include not only REGs corresponding to symbols different from each other but also REGs belonging to a different RB.

When REG-to-CCE mapping is performed on a CORESET having duration equal to or longer than 2 symbols, it may be able to support time-first mapping to the REG-to- CCE mapping. An REG bundle can be configured to be identical to time domain duration of a CORESET in time domain. In case of the non-interleaved type, 6 REGs constructing a CCE may correspond to 1 REG bundle and the REGS of the CCE can be localized in time/frequency domain. In case of the interleaved type, 2, 3, or 6 REGs may correspond to 1 REG bundle and REG bundles can be interleaved within a CORESET. A UE may assume the same precoding within 1 REG bundle according to a precoder granularity or assume the same precoding for a plurality of REG bundles.

Decreasing Channel Estimation Complexity Related to PDCCH Reception

In the LTE system, a aggregation level of control channel candidates that user equipment should monitor on each subframe to receive the PDCCH, and the number of the control channel candidates for each aggregation level are fixed. Therefore, the user equipment attempts blind decoding on the same number of control channel candidates on each subframe.

Figure 2:
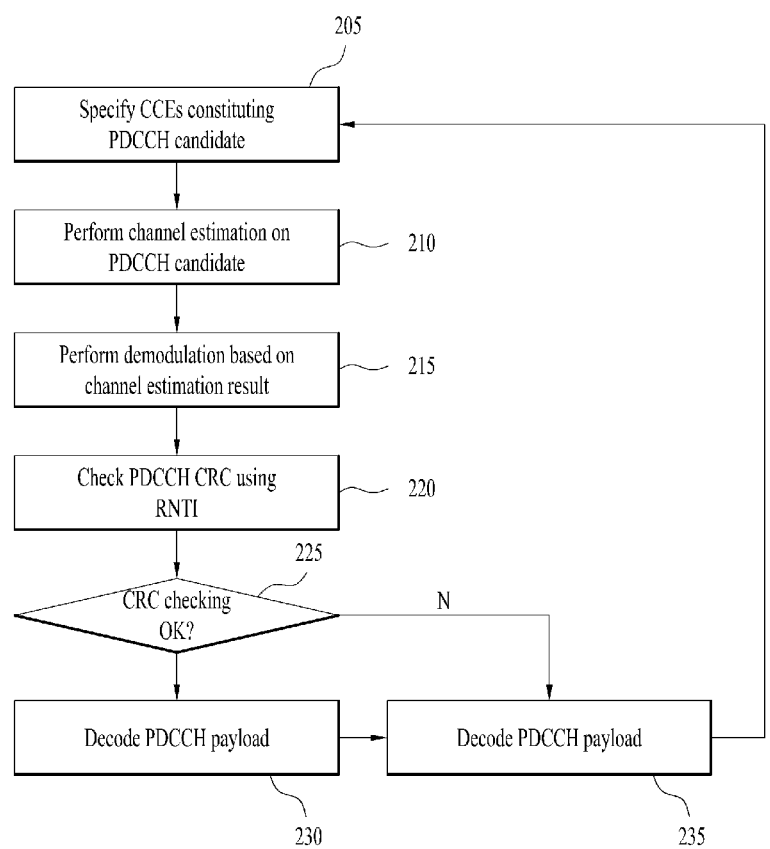
FIG. 2 illustrates an operation of conventional user equipment for a process of blind decoding a PDCCH.

FIG. 2 illustrates an operation of conventional user equipment for a process of blind decoding a PDCCH. An attempt to the blind-decode may include a series of processes including, for example, examining, by the user equipment, a CRC for an aggregation of resources (e.g., PDCCH candidates) on which the PDCCH is likely to be transmitted using an assigned identifier (e.g., RNTI) thereto, and upon determination that the CRC check result is positive for the PDCCH candidates, performing demodulation and decoding the PDCCH candidates by the user equipment with assuming that a PDCCH being transmitted thereto is mapped to a corresponding PDCCH candidate.

Referring to FIG. 2, the user equipment specifies 205 CCEs of a PDCCH candidate that is currently subjected to the blind decoding among the PDCCH candidates included in the search space. One scheme of specifying the CCEs constituting the PDCCH candidate may employ a predefined hashing function. In order to avoid obscuring a key point of the present disclosure, a description of the hashing function itself is omitted. However, the details of the hashing function are disclosed in the standard document of TS 36.213.

The user equipment performs channel estimation for the PDCCH candidate based on the specified CCEs 210. For example, the user equipment UE performs channel estimation on CCEs (i.e., resources) constituting the PDCCH candidate. A reference signal may be used for the channel estimation.

The user equipment performs demodulation on the PDCCH candidate based on the channel estimation result 215. For example, based on the channel estimation result, the user equipment may acquire a complex symbol corresponding to a signal received on the CCEs constituting the PDCCH candidate. The user equipment may obtain bits corresponding to the complex symbol by performing demodulation on the obtained complex symbol.

The user equipment checks 220 bits corresponding to a PDCCH CRC using a UE identifier (e.g., C-RNTI, SI-RNTI, P-RNTI, etc.) allocated to the user equipment. The BS may scramble the PDCCH CRC via the RNTI. In this connection, the UE may determine via the PDCCH CRC whether a corresponding PDCCH is transmitted to itself.

When the CRC check result based on the RNTI is positive, the UE decodes a PDCCH payload 230. When the result of CRC check based on RNTI is negative, the UE selects a PDCCH candidate next to the current PDCCH candidate and again attempts to perform a PDCCH detection associated with the selected PDCCH candidate (235).

In one example, a cell specific reference signal (CRS) is used for demodulation of the LTE PDCCH. In the LTE system, the CRS is transmitted on all subframes in the time domain. The CRS is transmitted in the entire system band in the frequency domain. The CRS may be used for channel estimation for demodulation of control/data channels. The CRS may also be used for channel state information (CSI) measurements. Optionally, the CRS may also be used for radio resource management (RRM) measurements.

Since the PDCCH demodulation is performed based on the CRS transmitted in the entire system band, the UE may obtain a channel estimation result for the entire system band by performing DFT-based channel estimation once. The UE could derive the channel estimation result for each RE of the PDCCH region from the channel estimation result for the entire system band. For the LTE enhanced PDCCH (EPDCCH), the total number of RBs is also limited, which in turn limits the number of channel estimations required for the UE to receive the EPDCCH.

In the NR system, a demodulation reference signal (DM-RS) is used for demodulation of the PDCCH. Unlike the CRS of legacy LTE, the DM-RS is not transmitted in the entire system band. The DM-RS may be transmitted, for example, in a frequency band in which the PDCCH is transmitted, if necessary. Further, the DM-RS may not be necessarily transmitted on all subframes.

In the NR system, a search space set for receiving the PDCCH is defined. A search space may be defined as an aggregation of candidates at a particular aggregation level (AL). The search space set may mean a set of search spaces having ALs. For example, a search space with AL 1 and a search space with AL 4 may constitute a single search space set. Configuration information for the search space set may be transmitted to the UE via a higher layer signaling (e.g., RRC). The configuration information for the search space set may include the AL of control channel candidates for which the UE should perform monitoring in the corresponding search space set, and the number of the control channel candidates for each AL. For example, the configuration information for the search space set includes the number of AL 1 candidates (e.g., 0 to 8), the number of AL 2 candidates (e.g., 0 to 8), the number of AL 4 candidates 8), the number of AL 8 candidates (e.g., 0 to 8) and the number of AL 16 candidates (e.g., 0 to 8). When the number of candidates having a corresponding AL is 0, the UE may not attempt blind detection for the corresponding AL candidate. Further, the configuration information for the search space set may include information about periodicity (e.g., monitoring periodicity) at which the UE should monitor the corresponding search space set. One or more search space sets may be configured for the UE. The configuration information for the search space sets may be configured independently of each other.

Channel estimation for an NR control channel tends to increase according to the BW and duration of a CORESET configuration, and the BW of a configurable CORESET is not limited to specific RBs. Therefore, the channel estimation complexity of the NR control channel varies according to various parameters such as the distribution of search space candidates, a hashing function between an REG bundle and an AL, and so on.

The UE may perform blind decoding on a large number of candidates during a specific time unit. From a network point of view, this has the advantage that scheduling flexibility may be improved because this may increase resource utilization. On the other hand, from the viewpoint of the UE, a decoding operation for the control channel, a reception operation of the PDSCH scheduled by the control channel, and a HARQ process in response to the PDSCH reception increase an operation complexity. This may cause a problem such as delay propagation.

In order to prevent such a problem from occurring, the maximum number of blind decodings that the UE should perform during a specific time unit (e.g., 1 slot) may be defined. The maximum number of blind decodings means the total number of candidates for which the UE must perform blind decoding. Thus, the maximum number of blind decodings may be referred to as the maximum number of the candidates which the UE monitors. The UE should be able to perform the blind decodings the defined maximum number of times within a given time unit (e.g., one slot). The network may perform scheduling for multiple UEs based on the maximum number of blind decodings.

Further, since NR-PDCCH operates based on the DM-RS, the number of CCEs (or the number of REG bundles) may be defined as the number of resources for which the UE should perform channel estimation within a specific unit time. The UE performs channel estimation on a REG bundle basis. Since the number of REG bundles per CCE remains the same in the CORESET, the number of REG bundles or CCEs for which the UE should perform channel estimation in a certain time unit may be defined. The number of CCEs for which the UE should perform channel estimation during the unit time may mean the number of CCEs that do not overlap with each other. This is because, for overlapping CCEs, the UE may reuse the channel estimation result.

In one example, the maximum number of channel estimations may be defined as follows.

(i) The number of CCEs in all candidates: in one example, the number of CCEs belonging to all candidates that the UE should monitor for a unit time (e.g., 1 slot) may be defined as the maximum number of channel estimations. In this connection, the number of CCEs may mean the number of CCEs that do not overlap with each other.

When a Wideband RS is used, the constraint on the maximum number of channel estimation as described above may not be applied.

The Wideband RS is a type of DM-RS that is transmitted for PDCCH demodulation. The Wideband RS may be transmitted in a relatively wide frequency band. The Wideband RS is associated with the same precoding assumption by the UE. In a CORESET where the Wideband RS is not used, the UE assumes the same precoding within a 1 REG bundle. On the other hand, in a CORESET in which the Wideband RS is used, the UE may assume that a RS is transmitted on all the REGs in a set of consecutive resource blocks and the UE may assume the same precoding within the corresponding consecutive resource blocks. Whether or not the Wideband RS is used may be given as precoder granularity information in a CORESET configuration.

In one example, in the case of CORESET where the wideband RS is used, the UE may perform DFT-based channel estimation. In this case, the complexity of channel estimation may be greatly reduced. Therefore, the constraint considering the channel estimation complexity may not be applied.

Alternatively, the BS/UE may assume the channel estimation complexity of the CORESET configured with the wideband RS to be K or a predetermined value. For example, K may be a value proportional to the number of chunks (e.g., contiguous PRB chunks) in the CORESET, a value determined in consideration of a maximum number of chunks, or a value proportional to the BW (e.g., the amount of resources in the frequency domain) of the CORESET or the sum of the BWs of chunks in the CORESET.

As described above, a different channel estimation complexity estimation method from that for the normal RS may be applied to the wideband RS.

(ii) Number of REG bundles in all candidates: When the Wideband RS is used, the constraint on the maximum number of channel estimations may not be applied.

Depending on the duration of the CORESET for NR PDCCH transmission, the number of REG bundles constituting one CCE may be differently configured. Since the UE performs channel estimation on a REG bundle basis, the channel estimation complexity may be different between CCEs depending on the number of REG bundles per CCE. Therefore, the channel estimation complexity may be expressed based on the number of REG bundles. The channel estimation complexity may vary depending on the number of REG bundles per CCE.

(iii) Number of precoder bundles (regardless of whether the precoder bundles are the same):

When the Wideband RS is used, the number of chunks (e.g., bundles of contiguous resources) within a CORESET may define the number of precoder bundles. When the Wideband RS is used, the number of REG bundles may define the number of precoder bundles.

When the Wideband RS is used, and when data (e.g., control channel) is transmitted on consecutive resources within the CORESET in the frequency domain, a RS (e.g., the same precoding RS) is transmitted on all the REGs in a region in which the continuous resources are located. In this case, the channel estimation complexity may be expressed as the number of consecutive resources (i.e., chunks).

The maximum number of blind decodings and the channel estimation capability as described above may be defined to be associated with each factor (e.g., whether the Wideband RS is used, the SCS numerology, and whether multiple CORESETs overlap each other). For example, as shown in Table 4 below, for a specific SCS numerology, the maximum number of blind decodings X in one slot and the channel estimation capability (e.g., the number of CCEs or the number of REG bundles) may be predefined as Y, or may be indicated to the UE via higher layer signaling.

TABLE 4

| Subcarrier spacing numerology | Maximum number of Blind decoding (i.e., candidates) | Maximum number of CCEs |
|---|---|---|
| 0 (15 kHz SCS) | X | Y |
| 1 (30 kHz SCS) | A | B |
| 2 (60 kHz SCS) | C | D |
| 3 (120 kHz SCS) | E | F |
| ... | ... | ... |

Further, when the channel estimation capability (or the maximum number of channel estimations) is defined, the number of CCEs (the number of REG bundles or chunks) may mean the number of CCEs (the number of REG bundles or chunks) on which the UE actually needs to perform channel estimation. For example, on the assumption that the channel estimation capability is defined as the number of CCEs, when one CCE is included in N control channel candidates, the CCE is preferably counted as one CCE, instead of N. In other words, the afore-described number of CCEs may mean the number of non-overlapping CCEs.

If one CCE is included in multiple candidates in the same CORESET, the CCE may be counted as 1. In general, the relationship between the number X of blind decodings and the number Y of channel estimations may be assumed to be Y=m*X where m may be a UE capability or a value that varies according to a numerology (e.g., SCS). Alternatively, different m values may be applied or supported depending on a processing time (e.g., fast/short processing time or slow/normal processing time) supported by the UE. Alternatively, m may vary according to a set of ALs supported by the UE. Alternatively, m may vary according to the highest AL in a set of ALs configured for the UE. For example, m=3 for a 15/30-kHz SCS, and m=2 for a 60/120/240-kHz SCS. For example, the number of channel estimations may be calculated by multiplying the number of blind detections by a weight determined by at least one of an AL, an SCS, a processing time, or the number of candidates for each AL.

When, as described above, the maximum number of blind decodings and the maximum number of REG bundles (or CCEs) are defined, there may occur a situation where the blind decoding for some control channel candidates may need to be limited depending on the CORESET size and/or the configuration (e.g., monitoring periodicity, etc.) of each search space set.

For example, when the size of CORESETS is small, thereby causing significant resource overlaps between different candidates, the UE may reuse the result of the channel estimation on a REG bundle basis. As a result, the number of control channel candidates monitored by the UE may increase to the maximum number of the REG bundles (or CCEs).

On the other hand, when the CORESET size is large and thus there is no resource overlap between the candidates, the UE must perform channel estimation on all REG bundles without re-using the channel estimation result. Thus, (because this situation causes the UE capability to exceed the maximum channel estimation capability), the UE may be unable to perform the blind decoding on some of the candidates configured to be subjected to the blind decoding.

In another example, different search space sets may have different monitoring periodicities. Thus, in a certain unit time (e.g., a common multiple between the monitoring periodicities), the UE may need to perform blind decoding simultaneously on different search space sets. Accordingly, the channel estimation complexity increases only in the corresponding unit time. It may happen that the UE has to skip the blind decoding for some candidates. In this connection, when the network and the UE are supposed to skip blind decodings for different candidates therebetween, the transmission and reception performance of the control channel may be significantly degraded due to the different understanding in terms of the candidates to be blind-decoded between the network and the UE.

In one embodiment of the present disclosure, in order to solve such a problem, a scheme is proposed in which when the number of candidates and/or the number of channel estimations exceeds a predetermined maximum value, the UE skips some of the blind decodings configured for a corresponding search space set. That is, the UE may skip blind decoding for some control channel candidates in the corresponding search space set. To this end, an approach is needed by which the UE selects a candidate to be subjected to the channel estimation (or a candidate configured to be subjected to the blind decoding).

In other words, when the number of blind decodings exceeding the channel estimation capability of the UE is configured for the UE, it is not necessary for the UE to perform blind decoding on all candidates beyond the channel estimation capability of the UE. However, the network and the UE have the same understanding as to which candidate for which the UE skips the blind decoding. To this end, a priority rule related to the candidate selection/drop is required.

To avoid a situation in which the UE skips blind decoding for some candidates, the network may configure ALs and candidates within the capability of the UE in consideration of the number of blind decodings or the channel estimation capability. In this case, however, the channel estimation complexity may have to be counted differently from the actual channel estimation complexity of the UE. Although the actual channel estimation complexity may become relatively low depending on a reuse factor (e.g., the ratio of overlapping CCEs/REGs between monitoring candidates), when the network configures ALs and candidates, the network may not count the complexity in consideration of an actual situation and thus have to assume the worst case. An example of the worst case may be to compute the channel estimation complexity on the assumption that the candidates do not overlap with each other at all. This may mean that the complexity should be separately counted for other CORESETs.

In this case, the estimated channel estimation complexity may be greater than the actual channel estimation complexity, and the smaller the bandwidth, the greater the difference. Therefore, the network/UE may calculate the channel estimation complexity by assuming a reuse factor. For example, this reuse factor may be a function of a BW or may be determined by higher-layer signaling.

The actual number of actual CCEs/REGs or channel estimations counted in consideration of the reuse factor may exceed the capability of the UE. In this case, the UE may skip blind decoding for all candidates, read some candidates depending on UE implementation, or perform a different operation depending on the UE implementation. In this situation, to lose as few candidates as possible, that is, to secure as many available candidates as possible, the UE/network may assume that an AL used in a corresponding search space is the same as the AL of the most recent DCI (e.g., the most recent DCI which has been successfully received). Therefore, the UE may reduce the number of blind decodings by first attempting to detect candidates of the same AL as the AL of the most recent DCI or by attempting to detect candidates for only a corresponding AL. Alternatively, the UE may assume that only the CORESET carrying the most recent DCI is used. As such, the history-based candidate selection scheme may be used. The UE may reduce the number of actually performed blind decodings/channel estimations by performing only decoding for the CORSET and AL of the most recent DCI that has been successfully decoded.

This assumption may apply only to a USS. For example, for a CORESET including a CSS, it may be assumed that this case is prevented by not using a reuse factor or by assuming a very small reuse factor at the U/network, or candidates are unreadable depending on the implementation of the UE. Alternatively, the network/UE may assume that a specific AL (e.g., AL=8 or 16) is fixedly used in the case.

To avoid this constraint, the network may configure a search space without considering the channel estimation complexity significantly, and temporarily reduce the number of candidates by the following operations when the channel estimation complexity exceeds the UE capability.

<Priority Determination>

Approaches proposed below may be applied alone or in combination with each other. Further, the following approaches may be implicitly applied to various situations where the UE may arbitrarily skip a candidate without an separate signaling by the network. Alternatively, the network may instruct the UE to use a specific approach. Hereinafter, CORESET may be interpreted as a variety of resource units or search space sets for a configuration of a search space.

Example 1) CORESET Priority

In an NR system, multiple CORESETs may be configured for a single UE. A priority for a number of CORESETs may be defined. Depending on the factor including the channel estimation complexity, the UE may preferentially skip a candidate in a CORESET with low priority, if necessary. That is, the UE preferentially monitors a candidate in a CORESET having the highest priority, and, subsequently, the UE may perform the blind decoding until a maximum channel estimation capability thereof is reached.

In one example where the implicit priority is applied, the priority may be determined according to the CORESET Configuration in the following manner. Alternatively, when the priority is explicitly determined/indicated by the network, signaling may be performed to determine/indicate the priority based on the CORESET configuration below.

(1) CCE-to-REG Mapping

In the NR system, the CCE-to-REG mapping type of each CORESET may be determined depending on whether interleaving is applied to each CORESET. An example of when interleaving is used may include: a case when the UE-common control information (e.g., cell-common control information such as system information or the UE group-common control information such as power/slot format) is transmitted in a corresponding CORESET, or a case when there is no feedback or inaccurate feedback on the channel state between the BS and the UE, thereby making it inappropriate for the BS to use UE-dedicated beamforming.

When the UE must perform blind decoding for a plurality of CORESETs using the same time resource, and the UE must skip the blind decoding for a specific candidate due to the channel estimation complexity (e.g., when the complexity exceeds a predefined maximum number of REG bundles (or CCEs)), a specific CCE-to-REG mapping type may be configured or predefined to have a higher priority.

For example, when the interleaving-applied CORESET 1 and the interleaving-free CORESET 2 are configured for the UE, the UE may preferentially perform blind decoding for candidates belonging to the CORESET 1 to which the interleaving is applied, rather than blind-coding for candidates belonging to the CORESET 2 to which the interleaving is not applied.

(ii) RS Type (Precoder Granularity)

In one example, the priority may be determined based on precoder granularity configured for each CORESET.

As described above, the precoder granularity in the NR system may correspond to a REG bundle size in the frequency domain, or to the Wideband RS. When the Wideband RS is used and when control information is transmitted on consecutive RBs in a CORESET, the UE may assume followings: the RS is transmitted on all the REGs belonging to the corresponding consecutive RBs, and the same precoding is used in the corresponding consecutive RB regions.

In one example, a CORESET for which the Wideband RS is configured may have a higher priority than a CORESET for which the Wideband RS is not configured. In general, the Wideband RS may be used as an approach to cover a wide coverage or to increase a decoding performance. Further, the Wideband RS may be used when more important information is delivered to a large number of UE. Thus, it may be desirable to assign a higher priority to the CORESET for which the Wideband RS is configured.

(iii) RS Configuration

A high priority may be assigned to a CORESET configured with a shared RS. When a CORSET is configured with a CSS or a group common search space (GSS), the UE/network may assume that the CORSET is configured with a shared RS.

(iv) Transmission History

A highest priority may be assigned to a CORESET carrying the most recent DCI (e.g., limited to UE-specific DCI). A transmission history may be restrictively applied to the same DCI format or information scrambled with the same RNTI.

In another method, CORESETs may be prioritized by their CORESET indexes or the like. For example, assuming that CORESETs are prioritized implicitly, it may be predefined that the UE first performs blind decoding for a CORESET with the lowest (or highest) CORESET index. When CORESETs are prioritized by explicit signaling, the network may signal the priority of each CORESET. The priorities of CORESETs may be determined in a combination of the above-described various methods. For example, the highest priority may be assigned to a CORESET configured with a CSS, and if there are two or more CORESETs configured with the CSS, the priorities of the CORESETs may be further determined based on their CORESET indexes.

Example 2) Search Since Set Priority

The UE may receive configurations for different search space sets from the network. The monitoring periodicities for different search space sets may be configured differently. In a specific time resource, different search space sets may overlap. In this case, for a specific search space set, the priority may be configured to be higher via predefinition or via network configuration (e.g., higher layer signaling). When the UE has to skip blind decoding for some candidates, the UE may firstly skip candidates belonging to a search space set having a low priority. Thus, it is preferable for the network to identify candidates for which the UE will skip blind decoding and not to map a PDCCH of the UE to the identified candidate. In other words, it is preferable for the network to map the PDCCH to a candidate to be monitored by the UE.

In this way, the priority may be determined/configured in a unit of a search space set. The priority may be determined via predefinition or network signaling. For example, the priority may be determined based on at least one of following (i) to (iv) elements. The present disclosure is not limited thereto.

(i) Search Space Type

The search space set may be largely classified into the user specific search space set (e.g., USS) and the cell-common search space set (e.g., CSS).

According to one embodiment of the present disclosure, the priority may be determined based on a DCI format that the UE should monitor in each search space set and/or on a search space type.

For example, a higher priority may be assigned to a search space set related to a CSS and/or a GSS than a search space set related to a USS. For example, when the search space set(s) related to the CSS/GSS overlaps with the search space set(s) related to the USS, and the UE is not capable of monitoring all PDCCH candidates in the overlapped time resources (e.g., the number of candidates to be monitored exceeds a maximum number of blind detections and/or the number of CCEs on which channel estimation is to be performed exceeds a maximum number of CCEs), the UE may first attempt to detect (e.g., blind-decode) a PDCCH in candidates included in the search space set(s) related to the CSS/GSS. When the UE still has an extra processing capability (e.g., when the UE is capable of additional blind detection and channel estimation) after blind detections and channel estimations of the whole search space set(s) related to the CSS/GSS, the UE may also attempt to detect a PDCCH in the search space set(s) related to the USS. When the UE reaches the maximum number of blind detections and/or the maximum number of CCEs, the UE may skip candidates belonging to a lower-priority search space set (e.g., the search space set related to the USS).

Accordingly, the network should be able to determine the candidates monitored by the UE and the candidates skipped by the UE. Then, the network may map a PDCCH in a candidate monitored by the UE based on a result of the determination.

For example, priority may be given in this order: CSS, GSS, and USS.

(ii) Aggregation Level

As described before, ALs of candidates to be monitored by the UE may be configured for each search space set in the NR system.

For example, the priority of each search space set may be determined according to ALs configured for the search space set. For example, a higher priority may be given to a search space set with higher (or lower) ALs.

(iii) The Number of Candidates (CCEs or REG Bundles)

The priority of each search space set may be determined by the number of candidates (the number of CCEs or REG bundles) to be monitored in the search space set.

For example, a relatively low priority may be assigned to a search space set with a large number of candidates for blind decoding. This may be preferable in that the UE may perform blind decoding for more search space sets in given time resources.

(iv) Search Space Set Index

Similarly to the afore-described example of prioritizing CORESETs, search space sets may be prioritized implicitly/explicitly based on the indexes of the search space sets. For example, a higher priority may be assigned to a search space set having a lower index.

For example, when the UE is not capable of monitoring both of search space set A with index 1 and search space set B with index 2 (e.g., the number of blind decodings and/or a channel estimation capability (e.g., the number of CCEs)), the UE may perform blind detection on the candidates of search space set A having the lower index, while skipping blind detection on the candidates of search space set B having the higher index. In this situation, when the BS intends to transmit a PDCCH to the UE, the BS may determine to transmit the PDCCH in search space set A having the lower index.

Because search space sets are prioritized in this manner, even though a plurality of search space sets are configured for one UE and time resources overlap between the search space sets at a time corresponding to a common multiple of the monitoring periodicities of the plurality of search space sets, the BS and the UE may clearly determine a candidate in which the PDCCH is to be transmitted and received. Further, as blind decoding/channel estimation is skipped for some candidates, the processing complexity of the UE may be reduced.

(v) Monitoring Periodicity

If the UE skips blind decoding for a search space having a long monitoring periodicity, the UE may take much time to receive control information in the search space. In the worst case, the UE may continuously skip blind decoding for the search space according to the priority of the search space. Therefore, a high priority may be assigned to a search space having a long monitoring periodicity. On the contrary, a low priority may be assigned to a search space having a long monitoring periodicity.

(vi) Explicit Priority on Search Space

The network/UE may set a priority for each search space.

(vii) Transmission history

A highest priority may be assigned to a search space in which the most recent DCI has been detected.

As described above, search space sets may be prioritized based on one or more of (i) to (vii). For example, assuming that the priorities of search space sets are determined according to (i) and (iv), the UE and the BS may operate as illustrated in FIG. 3.

Figure 3:
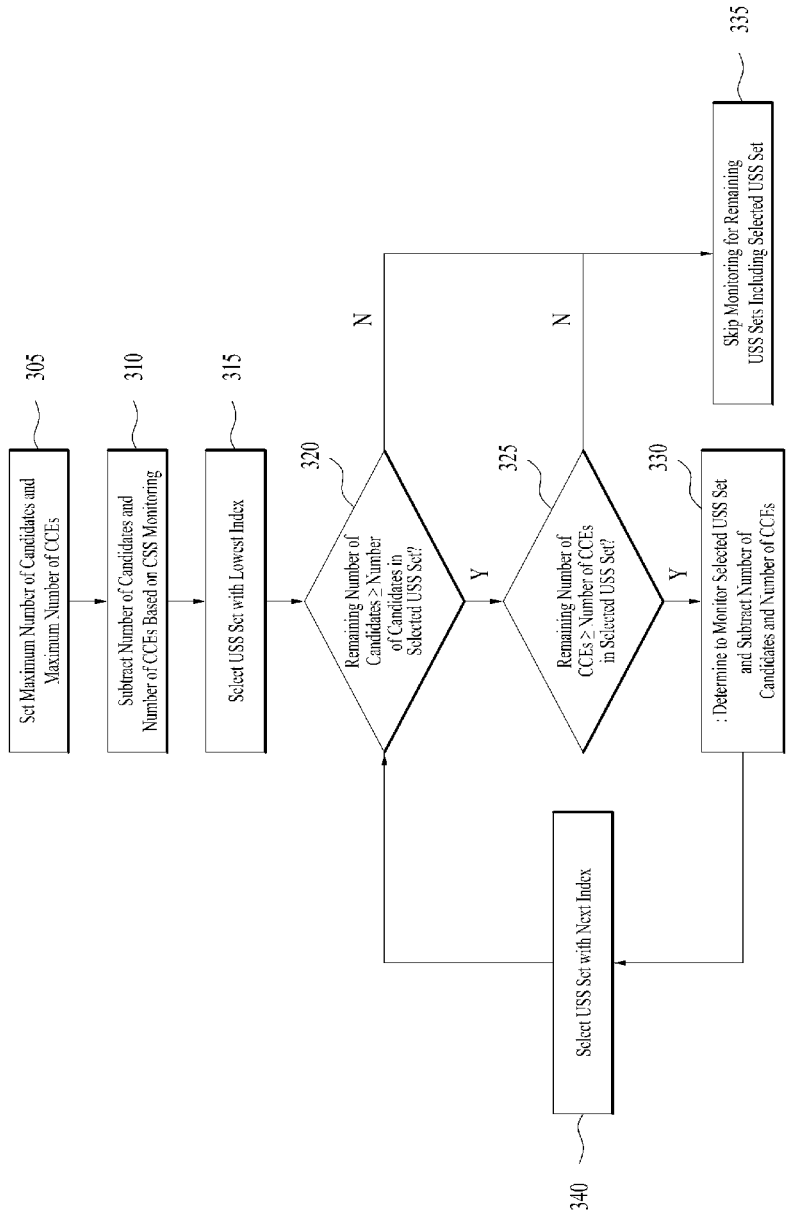
FIG. 3 shows a priority between search space sets for PDCCH blind detection according to one embodiment of the present disclosure.

Referring to FIG. 3, the UE/BS may determine a maximum number of candidates monitored and a maximum number of CCEs (e.g., non-overlapping CCEs) channel-estimated for a unit time (e.g., 1 slot) (305). As described above, the maximum number of candidates and the maximum number of CCEs may be determined according to an SCS, as described before.

The UE assigns a high priority to search space set(s) related to a CSS, and performs blind decoding first on PDCCH candidates in the search space set related to the CSS. The blind decoding process may include a process of performing channel estimation based on an RS by the UE. For example, the UE may demodulate PDCCH candidates based on a channel estimation result and attempt decoding based on complex symbols obtained through the demodulation. The decoding process may include a process of performing a PDCCH CRC check using a UE-specific/cell-specific/group-specific RNTI assigned to the UE. The maximum number of blind decodings and the maximum channel estimation capability (e.g., the number of CCEs) may be decremented based on the attempts of PDCCH detection in the CSS (310).

The UE may attempt PDCCH detection in search space set(s) related to a USS based on the remaining number of blind decodings and the remaining channel estimation capability available to the UE. If there are a plurality of USS-related search space sets and the USS-related search space sets are to be monitored simultaneously, the UE may consider the index of each of the USS-related search space sets.

For example, the UE first performs blind detection/channel estimation on PDCCH candidates in a USS-related search space set having a lower index, and then on PDCCH candidates in a USS-related search space set having the next lower index. The UE may skip blind detection/channel estimation for PDCCH candidates in a USS-related search space set having a high index that exceeds the maximum number of blind decodings or the maximum channel estimation capability of the UE.

Referring to FIG. 3 again, the UE selects a USS-related search space set having a lowest index (315). The UE decrements the maximum number in consideration of the CSS monitoring and determines whether the remaining number of candidates and the remaining number of CCEs are sufficient to monitor the current selected USS-related search space set (320 and 325).

If either the remaining number of candidates or the remaining number of CCEs is insufficient to monitor the current selected USS-related search space set, the UE skips monitoring for the remaining search space sets including the current selected search space set (335).

If both the remaining number of candidates and the remaining number of CCEs are sufficient to monitor the current selected search space set, the UE determines to monitor the current selected search space set, and subtracts the number of candidates and the number of CCEs (from the most recent values) (330). Thereafter, the UE selects a USS-related search space set having the next lower index (340).

As in the above-described UE operation, the BS may determine a search space set in which the UE attempts PDCCH detection and a search space set in which the UE skips PDCCH detection. The BS may select a candidate in the search space set in which the UE attempts PDCCH detection and then map/transmit a PDCCH in the selected candidate.

Example 3) Aggregation Level

When the priority for skipping the monitoring of the candidate is configured, the aggregation level may be referenced. For example, a high (or low) priority is assigned to a high aggregation level. Thus, monitoring of a candidate with an aggregation level that belongs to a lower (or higher) priority may be preferentially skipped.

In another approach, the priority for each aggregation level may be determined based on the number of candidates for each aggregation level. For example, the priority for an aggregation level with a larger number of candidates to be subjected to the blind decoding may be configured to be lower. In this way, the number of aggregation levels for which the UE performs blind decoding may be increased. This may increase the scheduling flexibility of the network.

In another method, the number of candidates for each AL may be adjusted, while an AL for blind decoding is maintained. For example, when a feedback on a channel condition of the UE is not correct, it is desirable for the UE to perform blind decoding for various ALs. Therefore, a candidate for blind decoding may be selected for each AL in a round robin manner.

For example, it is assumed that the UE should perform blind detection for 4, 4, 2, and 2 candidates for ALs 1, 2, 4, and 8, respectively. Then, the UE may select one candidate for each AL, starting from the highest (or lowest) AL. For example, the candidates may be prioritized in this order: AL8 $1^{st}$ candidate—AL4 $1^{st}$ candidate→AL2 $1^{st}$ candidate→AL1 $1^{st}$ candidate→AL8 $2^{nd}$ candidate→AL2 $2^{nd}$ candidate→AL2 $2^{nd}$ candidate→AL1 $2^{nd}$ candidate→AL2 $3^{rd}$ candidate→AL1 $3^{rd}$ candidate→AL2 last candidate→AL1 last candidate. The UE may perform blind detection on candidates within its channel estimation capability, while skipping blind detection for the following candidates. Although it is assumed that candidates are selected in a descending order of ALs in this example, other types of rules may be applied, such as, an ascending order of ALs or in an ascending or descending order of ALs with more (or fewer) candidates.

When a feedback on the channel state of the UE is not correct, it is preferable to perform blind decoding for various ALs. Therefore, the UE may select a candidate for blind decoding for each AL in a round robin manner.

As described before, based on the AL (e.g., X) of the most recently received DCI, candidates may first be allocated to an AL equal to ½ of the AL (e.g., X/2) and an AL equal to the double of the AL (e.g., 2*X). For example, the network/UE may first allocate candidates to X, X/2, and 2X from among a total number of candidates, and skip/drop as many candidates as needed in the remaining ALs. If the total number of candidates is insufficient to be allocated even to the 3 ALs, the network/UE may prioritize the ALs in the order of X/2→2X→X. This may be interpreted as history-based AL selection. A high priority may be given to the AL (or the AL and its close ALs) of the most recent successfully decoded candidate.

Example 4) Frequency

A higher priority may be assigned to a candidate (or CCE/REG) located at a lower (or higher) frequency. For example, when the UE performs blind detection in a corresponding slot, the UE may perform blind detection, starting from a candidate located at the lowest frequency. Then, the UE may perform blind detection by increasing (or decreasing) the frequency up to a frequency beyond the channel estimation capability of the UE.

Example 5) Resource (e.g., Candidate, CCE, REG) Index

A higher priority may be assigned to a resource (e.g., a candidate, CCE, or REG) having a lower (or higher) index. That is, when the UE performs blind detection in a corresponding slot, the UE starts from a candidate of a lowest index, and performs blind detection by increasing (or decreasing) the index to a point that exceeds its channel estimation capability. Method 5 may be used as a method of selecting/skipping at a candidate level in Methods 1, 2 and 3.

In the approaches except for Example 1) above, when there are multiple CORESETs and the associated search space sets, a priority may be applied to each CORESET or each channel estimation may be applied to each CORESET based on the number of blind detections. This may mean that a channel estimation budget is configured for each CORESET or for each search space set. For example, the UE distributes a predetermined channel estimation capability between CORESETs or between search space sets. Then, the UE may perform predetermined blind decoding in each CORESET (or for each search space set) while applying the priority rule as proposed above.

A priority rule using a combination of the approaches as proposed above may be applied. For example, the UE may configure a priority for each CORESET, and the UE may apply a weight to a number of blind decodings based on the priority, and, correspondingly, the UE may adjust a skip percentage of blind detection for each CORESET. Then, the UE may use some of the above rules to select a candidate not to be subjected to the blind detection in each CORESET.

If necessary, the UE may report its channel estimation capability (and/or priority rule) to the network. For example, the UE capabilities for blind decoding and channel estimation may be reported. The network may select resources to be used for DCI transmission to the UE based on the report of the UE.

Example 6) RNTI

Further, candidates may be prioritized according to RNTIs. For example, the candidates may be prioritized in this order of RNTIs: SFI-related RNTI, PI-RNTI (e.g., related to pre-emption), paging (P)-RNTI, RNTI transmitted in fallback DCI (e.g., RA-, TC-, or SI-RNTI), and RNTI transmitted in non-fallback DCI. The TPC-related RNTI may also be prioritized according to a target signal. This may mean that the priority is determined according to the degree to which the corresponding RNTI affects a UE operation. For example, the SFI-related RNTI determines a UL/DL direction of a resource in a slot, and the pre-emption-related RNTI has a great influence on the decoding operation of the UE because it may deliver information about rate matching or the like. Therefore, higher priorities may be assigned to these RNTIs.

Because an RNTI, a DCI format, and so on may be set in a search space set configuration, Example 6 may be included in Example 2 (search space set level priority).

<Configurable Hashing Function>

The above description is about the priority determination method for determining a specific candidate for which the blind detection is skipped when the blind detection for the specific candidate should be skipped due to the channel estimation complexity.

In the following, additionally, an approach for differently configuring hashing functions between situations to reduce channel estimation complexity is proposed. The hashing function serves to inform CCEs corresponding to a candidate that the UE should monitor in a predetermined CORESET. For example, the UE may specify the CCEs constituting each candidate using the hashing function.

Approaches as described below may be applied only when a corresponding situation exceeds a maximum channel estimation capability of the UE.

A nested structure may be considered to reduce channel estimation complexity. The nested structure may be employed as an approach for reusing a channel estimation result between different candidates by inducing resource overlap between candidates with different aggregation levels.

In one example, for a candidate with the highest aggregation level, the UE applies an existing hashing function (e.g., a hashing function of the EPDCCH approach) to all CORESETs, and, then, the UE may specify CCEs constituting the candidate with the highest aggregation level. However, for candidates with lower aggregation levels, the UE may apply the existing hashing function to a resource occupied by the candidate with the largest aggregation level, rather than to all CORESETs. In this case, since the candidates with lower aggregation levels always belong to the resource occupied by the candidate with the highest aggregation level, the channel estimation result may be reused for the nested or overlapping resources.

According to one embodiment of the present disclosure, when the number of candidates exceeding a number corresponding to the channel estimation capability which may be performed in a specific time resource are configured for the UE, the UE may apply a hashing function for the nested structure without skipping the candidates.

In one example, when the number of candidates configured for a single search space set exceeds a channel estimation complexity that the UE may perform within the unit time, the UE/BS may assume that the nested structure is applied to the corresponding search space set. For example, in a conventional case where there is no problem in channel estimation complexity, for candidates with aggregation levels, the UE applies a hashing function to all CORESETs. To the contrary, when the channel estimation complexity exceeds a complexity degree that the UE may deal with within the unit time, the UE may apply a hashing function for a lower aggregation level to a resource occupied by the candidates having the largest aggregation level.

When a channel estimation complexity exceeds a tolerance due to the overlap between multiple search space sets, the above-mentioned priority determination approach and the nested structure may be used together. In one example, when a CORESET priority is configured and the channel estimation complexity exceeds the tolerance, the UE may apply the nested structure to a CORESET having a low priority.

In one example, the configurable hashing function may be applied as follows. The following approaches may be applied only when the current situation exceeds the UE's channel estimation capability.

When the number of potential channel estimations that the UE should perform for a corresponding CORESET/search space set exceeds a specific limit, parameters for configuring the nested structure may be applied to initialization of the hashing function. This may mean applying different hashing functions to the CORESET/search space sets. Alternatively, this may mean that a hashing function is applied that operates on different resource regions.

It may be determined whether the nested structure is applied to the configuration of the CORESET or search space set according to the aggregation level. For example, the UE/BS may assume that the nested structure is applied when AL=16 or 8 is configured. In other words, when the AL of the candidate to be subjected to blind decoding does not include 16 or 8, a non-nested structure may be applied. Alternatively, when the number of candidates with a specific AL is greater than or equal to a specific value, the UE/BS may assume that the nested structure is applied. For example, when for AL=16, the number of candidates for which the UE should perform blind decoding is greater than 1 (alternatively, when for AL=8, the number of candidates for which the UE should perform blind decoding is greater than 2), the UE/BS may assume that a parameter (or hashing function) for configuring the nested structure is applied.

It may be determined depending on the RS type used in the CORESET or search space set, whether or not the nested structure is applied. For example, in a CORESET or search space set to which the Wideband RS is applied, the UE/BS may assume that the nested structure is not applied (since the channel estimation complexity does not increase significantly).

It may be determined, based on the BW of the CORESET, whether or not the nested structure is applied. When the BW of the CORESET is large, a nested structure may be needed to reduce channel estimation complexity. When the CORESET BW is small, there may occur a lot of resource overlaps between candidates even when the conventional hashing function is applied. Thus, the UE frequently reuses the channel estimation result. Therefore, when the CORESET BW is greater than the number of specific RBs, the UE/BS may assume that a parameter or hashing function for configuring the nested structure is applied.

Whether or not the nested structure is applied may be signaled to the UE by the network. The network may signal to the UE whether or not the nested structure is applied to each CORESET, using a UE-specific RRC signaling or a broadcast signal, in consideration of the UE distribution and the CORESET configuration. Alternatively, the BS may signal, to the UE, which application criterion among the plurality of nested structure application criteria as suggested above to be applied to determine whether the nested structure is applied.

It may be determined based on a CCE-to-REG mapping approach in the CORESET whether or not the nested structure is applied. For example, the UE/BS may determine, based on whether interleaving is applied, whether to use a nested structure or a non-nested structure. For example, in a localized mapping approach that the interleaving is not employed, the CCEs that constitute the candidate are localized. Thus, the nested structures may be easily configured. Therefore, in a case of the localized mapping approach, the nested structure is applied. In a case of a distributed mapping approach, a non-nested structure is applied. Such a nested structure application criterion may be defined in advance or may be indicated to the UE via a higher layer signaling, and the like by the BS.

It may be determined based on the search space type (or DCI format, RNTI) whether the nested structure is applied. For example, the UE/BS may use a non-nested structure for a search space set used as a CSS. The UE/BS may use a nested structure for a search space set used as a USS. Such a nested structure application criterion may be defined in advance or may be indicated to the UE via a higher layer signaling, and the like by the BS.

Further, when multiple CORESETs or search space sets overlap each other, a resource region to which the nested structure is applied may be determined according to the priority rules proposed above. For example, the UE may apply the nested structure to a CORESET with a high priority (or a low priority) to perform the blind detection.

If the nested structure is applied differently according to the channel estimation complexity as described above, each UE may use a different hashing function, thereby complicating candidate scheduling of the network. Therefore, in one approach to solve the problem, it may be configured whether the nested structure is used in a 'slot set', 'search space set' or 'CORESET set'. In this case, the network may configure UEs sharing the corresponding slot/SS/CORESET to use the same hashing function.

In another example, when the channel estimation complexity is beyond the capability of a UE, the UE may first drop candidates that do not satisfy the nested structure. A candidate that does not satisfy the nested structure may be defined as described in, for example, Alt. 1 to Alt. 3.

Alt. 1: If any of REG bundles included in the candidate belongs to a candidate of an AL higher than the AL of the candidate, the candidate is defined as satisfying the nested structure, and otherwise it is defined as not satisfying the nested structure.

Alt. 2: If any of the REG bundles included in the candidate belongs to a candidate of a highest AL, the candidate is defined as satisfying the nested structure, and otherwise it is defined as not satisfying the nested structure.

Alt. 3: If any of the REG bundles included in the candidate belongs to a candidate of an AL different from the AL of the candidate, the candidate is defined as satisfying the nested structure, and otherwise it is defined as not satisfying the nested structure.

The above definition of the nested structure may also be applied to CCEs. For example, REG bundle may be replaced with CCE in the above description. For example, in Alt. 1, if any of CCEs included in the candidate belongs to a candidate of an AL higher than the AL of the candidate, the candidate may be defined as satisfying the nested structure, and otherwise, it may be defined as not satisfying the nested structure.

The UE may drop a candidate including a CCE that does not satisfy the nested structure. For example, the UE may drop the candidate only if none of CCEs in the candidate satisfy the nested structure, or if at least one of the CCEs in the candidates does not satisfy the nested structure.

When blind detection is selectively performed according to whether the nested structure is satisfied in this manner, the number of candidates on which the UE performs blind detection may be reduced. To compensate for the decrease in the number of candidates, as many candidates as the number of dropped candidates may be mapped successively to candidates that have not been dropped. For example, it is assumed that the UE starts monitoring in CCE 4 to monitor 4 candidates for AL=2, CCEs 4 and 5 do not satisfy the nested structure, and CCEs 6 to 11 satisfy the nested structure. Then, the 4 candidate candidates of AL 2 monitored by the UE may be mapped successively to [CCEs 6-7], [CCEs 8-9], [CCEs 10-11], and [CCEs 12-13], respectively. In general, when a nested CCE is included, there is a high probability that the next CCE is also nested. Therefore, the use of this method may reduce the channel estimation complexity of the UE without reducing the number of blind detections of the UE. This may be understood as implicitly forming the nested structure without changing a hashing function.

<BD Selection Based on Maximum Number of BDs>

For different search space sets, different monitoring periodicities, different ALs, and/or different numbers of candidates for each AL level may be configured. Accordingly, it may occur that the UE should perform many blind detections in a specific slot in which a plurality of search space sets overlap with each other in terms of their monitoring periodicities, while the UE should perform monitor only one search space set in another slot. Preferably, the UE performs blind detection on as many candidates as possible in a slot having a small number of search spaces or candidates to be monitored, for scheduling flexibility of the network. However, the number of blind decodings that the UE should perform may exceed a maximum number of blind decodings in a slot in which different search space sets overlap with each other in terms of their monitoring periodicities.

To overcome the above problem, it is proposed that when the number of blind detections (e.g., the total number of candidates) exceeds a maximum number of blind detections per slot, the above proposed candidate selection rule is applied in an embodiment of the present disclosure. The UE may determine candidates for blind decoding in a corresponding slot in consideration of both of the maximum number of blind decodings and the maximum number of channel estimations.

For example, the number of candidates to be monitored by the UE may be determined based on a CORESET and search space set configuration for a specific slot in consideration of a predefined maximum number A of blind decodings and a predefined maximum number B of channel estimations. When the determined number of candidates is larger than the maximum number of blind decodings, the UE may determine candidates for blind decoding according to the above proposed method. The UE may then derive the number of channel estimations for the determined candidates. When the derived value exceeds the maximum number of channel estimations, the candidates may be filtered again in the above proposed method.

<Counting Rule of Channel Estimates>

When the number of channel estimations that the UE needs to perform in a specific slot exceeds a predetermined threshold, a prioritization rule for determining a candidate for blind decoding in the slot has been proposed above. In this specification, a rule for estimating a channel estimation complexity is additionally proposed.

It is obvious that the channel estimation complexity increases in proportion to the number of CCEs for which blind decoding is to be performed. However, in an embodiment of the present disclosure, an REG bundle size may be considered additionally in calculating the channel estimation complexity.

In the NR system, the UE may use a DMRS in channel estimation for PDCCH reception, and adopt mainly minimum mean squared error (MMSE)-based channel estimation for the channel estimation. Because the size of a matrix used for channel estimation is changed according to an REG bundle size in the MMSE-based channel estimation, the channel estimation complexity may increase exponentially with the REG bundle size. For example, regarding channel estimation for one CCE, when the REG bundle size is 2 REGs, the UE performs channel estimation for 2 REGs three times, whereas when the REG bundle size is 6 REGs, the channel estimation complexity is generally expected to increase 33 times.

Therefore, it is proposed in this specification that when the number of channel estimations is derived, a measure (e.g., the number of CCEs, the number of REG bundles, the number of REGs, or the like) representing the number of channel estimations is weighted according to the REG bundle size of each CORESET. For example, if the REG bundle size of CORESET A is 2, the number of CCEs to be blind-decoded in CORESET A is 10, the REG bundle size of CORESET B is 6, and the number of CCEs to be blind-decoded in CORESET B is 8 in a specific slot, the number of channel estimations may be calculated to be 10 for CORESET A and X*8 for CORESET B where X may be predefined or indicated by higher-layer signaling. The UE may compare a maximum number of channel estimations which is predefined or indicated by higher-layer signaling with the number of channel estimations in the corresponding slot (to which a weight associated with an REG bundle size is applied). If the number of actual channel estimations exceeds the maximum number of channel estimations, the UE may select actual candidates for blind decoding by applying the above proposed candidate selection method.

In counting a channel estimation complexity as proposed in the present disclosure, a resource (e.g., REG, REG bundle, or CCE) overlapped between different candidates of the same CORESET may be counted as one channel estimation, and candidates belonging to different CORESETs may be counted separately, even though their resources overlap with each other.

Additionally, when a wideband RS is used (e.g., when a precoder granularity is larger than an REG bundle size in the frequency domain), a channel estimation weight for the wideband RS may be introduced in a corresponding CORESET. When the wideband RS is used, DFT-based channel estimation may be used to reduce the channel estimation complexity. In this case, a weight may be separately applied to the wideband RS to apply a common criterion with a CORESET using MMSE-based channel estimation. For example, if the number of candidates to be blind-decoded in a CORESET using a wideband RS is 10, and the number of channel estimations is 20 CCEs as a result of counting a resource overlapped between candidates as 1 in the CORESET, the number of channel estimations may be derived as 20*M CCEs by applying a predefined weight M for the wideband RS. Herein, M may be defined differently depending on the BW of a CORESET.

For example, MMSE-based channel estimation using the DMRS may be expressed as Equation 1.

$$\hat{H}_{MMSE} = R_{hy} R_{yy}^{-1} y \quad \text{[Equation 1]}$$

In Equation 1, y represents a channel vector (in resources carrying an RS) estimated by the RS, $R_{hy}$ represents a cross-correlation matrix between resources corresponding to y and resources for which MMSE-based channel estimation is to be performed, and $R_{yy}$ represents an auto-correlation matrix between y and y. When the UE performs MMSE-based channel estimation for one REG, the (rows×columns) of the matrices $R_{hy}$ and $R^{-1}_{yy} y$ included in Equation 1 are (12×3), (3×3), and (3×1). If the REG bundle size is greater than 1, the (rows×columns) of the respective matrices are $\{(M*12)\times(M*3)), ((M*3)\times(M*3)), (M*3)\times1)\}$, for an REG bundle size=M. When the matrix operation of Equation 1 is performed in consideration of the size of each matrix, the number of multiplication operations for each REG bundle size in one CCE is listed in Table 5. A multiplication for one CCE refers to a value obtained by multiplying the number of REG bundles per CCE by the channel estimation complexity of each REG bundle, considering that one CCE includes 6 REGs.

TABLE 5

| REG bundle size | $R_{hy}$ | $R^{-1}_{yy}$ | y | Number of multiplications |
|---|---|---|---|---|
| 2 | 24 × 6 matrix | 6 × 6 matrix | 6 × 1 matrix | 3024 |
| 3 | 36 × 9 matrix | 9 × 9 matrix | 9 × 1 matrix | 6480 |
| 6 | 72 × 18 matrix | 18 × 18 matrix | 18 × 1 matrix | 24624 |

As noted from Table 5, the number of multiplications required for channel estimation of one CCE varies according to an REG bundle size applied to the CCE. While a complexity caused by the inverse operation of a matrix or RS-based channel estimation is excluded in the analysis of Table 5, it is obvious that as the REG bundle size increases, the complexity also increases.

On the assumption that the complexity of a CCE with a bundle size of 2 is 1 in deriving a channel estimation complexity based on the above multiplications, the total complexity may be derived by assuming the complexities of a CCE with a bundle size of 3 and a CCE with a bundle size of 6 to be 2 and 8, respectively.

More specifically, a weight for the number of channel estimations may be determined according to whether time-domain channel estimation such as 1D-MMSE, 2D-MMSE, or the like is included.

Further, the weight for channel estimation may be a value determined according to an REG bundle size (e.g., M for an REG bundle size of ⅔ and 4*M for an REG bundle size of 6) or a value determined according to an REG bundle size in the frequency domain (e.g., M for an REG bundle size of ⅔ and 4*M for an REG bundle size of 6).

Alternatively, the network/UE may assume the same complexity in units of K REGs or in units of one CCE in consideration of a time taken for a pipeline for one channel estimation operation.

Alternatively, because the capability of a UE may be determined according to the capacity of a buffer storing a channel estimation output result, the network/UE may assume a different channel estimation complexity for a different precoder, for example, consider a different channel estimation result to be a different complexity value. For example, as a precoder granularity increases, the channel estimation complexity may decrease.

Alternatively, an MMSE calculation and a buffer requirement may be weighted in a combination of these methods.

Alternatively, the channel estimation complexity may be counted as the number of 'REG bundles' in the frequency domain or a multiple of 6. Alternatively, the channel estimation complexity may be more simply counted as a linear function of the number of RBs in a CORESET.

When blind decodings beyond a predefined limit for a channel estimation complexity are required for a UE, a dropping rule for selecting a candidate for which blind decoding is to be skipped has been proposed before. Now, an additional candidate dropping method is proposed below. Drop rules proposed in the present disclosure may be implemented alone or in combination.

The UE may determine how many candidates in which resource pool are to be dropped (or blind-decoded) based on the number of candidates per unit resource. When a plurality of search space sets are to be monitored in the same slot, the UE may select a candidate for which blind decoding is to be skipped, as follows.

The number of candidates to be skipped in each CORESET associated with each search space set or a corresponding search space set may be determined based on the ratio of the number of candidates (CCEs or REG bundles) to be monitored in the CORESET to the total number of candidates to be monitored. The UE may determine the numbers of candidates to be skipped in each CORESET and each search space set based on the ratio of the number of candidates configured in the CORESET or the search space set to the total number of candidates configured in an entire corresponding slot.

For example, it is assumed that 10 CCEs are to be monitored in search space set #0, 20 CCEs are to be monitored in search space set #1, and a channel estimation complexity-related limit predefined or indicated by higher-layer signaling is 20. In this case, as many candidates as 10 CCEs or more candidates than 10 CCEs should be skipped. The number of candidates to be dropped in each CORESET (or search space set) may be determined according to the ratio of the number of candidates allocated to the CORESET (or search space set) to the total number of candidates. For example, candidates associated with at least 10 CCEs should be dropped, and search space sets #0 and #1 occupy 66.6% and 33.3% of the total candidates, respectively. Candidates (or CCEs) may be dropped at 2:1 in search space sets #0 and #1. For example, if candidates to be dropped are determined, starting from a low AL, the UE may drop two AL1 candidates in search space set #0 in a predetermined order and one AL1 candidate in search space set #1 in a predetermined order. The UE may then repeat the above operation until the number of CCEs associated with candidates to be dropped is equal to or larger than 10. For example, the UE may determine candidates to be dropped in the order of AL2, AL4 and AL8, or when there is no more candidate to be dropped for AL1, the UE may drop an AL2 candidate.

As clarified before, the number of candidates (or CCEs) to be dropped in corresponding resources may be determined based on the number (or ratio) of candidates or CCEs per unit resource. Herein, the ratio may refer to the ratio of the number of candidates (or CCEs) in a specific resource unit (e.g., a CORESET, a search space set, or an AL) to the total number of candidates (or CCEs) configured for the UE in specific time resources (e.g., slot). This method may apply on a resource unit basis. For example, when blind decodings beyond the limit of a channel estimation complexity are configured in a specific slot, the UE may derive the number of candidates to be dropped in each CORESET based on the number of candidates for the CORESET in the slot or derive the number and order of candidates to be dropped for each AL based on the number of candidates for the AL in each CORESET.

Additionally, the REG bundle size of each CORESET may be used as a criterion for determining candidates to be dropped. As the REG bundle size increases, the channel estimation complexity increases. Therefore, when candidates are configured for the UE beyond the limit of the channel estimation complexity, it may be predefined or indicated by higher-layer signaling that the UE first drops candidates in a CORESET with a large REG bundle size.

In another method, candidates may be prioritized, and the UE may apply the prioritization rule to all candidates configured for blind decoding in corresponding time resources (e.g., slot) and skip blind decoding for low-priority candidates. All or a part of the above proposed factors may be considered in the prioritization. For example, the priorities of candidates may be predefined or defined by higher-layer signaling according to CORESETs, search space sets, ALs, CCE-to-REG mappings, RS types, search space types, or REG bundle sizes. The UE may determine the priority of each candidate and then skip blind decoding for candidates, starting from a lower-priority candidate until reaching the number of CCEs corresponding to the channel estimation complexity limit. As such, the priority of each candidate may be defined and determined based on the above proposals.

For example, a CORESET-related parameter $A_0$ may be defined. $A_0=0.5$ for CORESET #0 and $A_0=0.9$ for CORESET #1. A search space type-related parameter $A_1$ may be defined. For example, it may be predefined or indicated by higher-layer signaling that $A_1=1$ for a CSS and $A_1=0.5$ for a USS. Similarly, a different weight may be applied to each AL, and a weight may also be considered for application or non-application of the nested structure. Once m parameters are determined in this manner, the priority of each candidate may be expressed as $A_0*A_1* \ldots *A_{m-1}$. As this priority is lower (or higher), the candidate may have a higher priority.

<Skipping Method for Approaching BD/CCE Limit>

Since excessive blind decoding skip of the UE imposes a constraint on DCI scheduling of the network, an embodiment of the present disclosure proposes a method of determining a candidate to be skipped at a UE, when a channel estimation complexity limit is approached, to solve the problem. This method may be understood as a method of performing blind decoding and channel estimation approaching a maximum limit.

For example, when the number of CCEs for blind decoding configured for the UE exceeds a limit, the UE needs to drop a candidate. In this case, it is assumed that the difference between the limit and the number of CCEs for which actual blind decoding is to be performed is 1, and the AL of the next candidate to be skipped is AL16. If the UE skips an AL 16 candidate, the UE performs channel estimations fewer than the limit by 15 CCEs. This means that there is a limitation on network scheduling for the UE.

The following methods are proposed to solve this problem. The following methods may also be applied to a process of skipping blind decoding for a candidate. For example, the following proposals may be applied in the process of reducing the difference between the number of CCEs used for actual channel estimation and a limit by blind decoding skip.

Method 1) When the difference between the limit for the channel estimation complexity and the number of CCEs used for actual channel estimation is less than or equal to X, the UE may no longer skip blind decoding. Hence, the complexity problem may be solved simply, and there may be a disadvantage in that the scheduling opportunity for each UE may be set differently according to a prioritization rule performed for each UE.

Method 2) When the difference between the limit for the channel estimation complexity and the number of CCEs used for actual channel estimation is less than or equal to X, it may be predefined that the UE skips blind decoding only for a specific AL (e.g., AL1) or an AL for which the UE is supposed to skip blind decoding may be indicated by higher-layer signaling. Additionally, when the UE is supposed to skip blind decoding for a specific AL, corresponding AL candidates may be prioritized in the above proposed methods. Despite the benefit of the best utilization of a given limit for the channel estimation complexity, Method 2) decreases candidates for a specific AL, thereby reducing the resource utilization. In order to apply Method 2) more efficiently, the network may set a plurality of thresholds so that the UE may skip a candidate belonging to a different AL in each period corresponding to each threshold.

When the UE needs to determine a candidate to be skipped from among candidates of the same priority, the UE may determine a candidate to be skipped by a UE ID or the like, for randomization of different CORESETs and/or randomization of UEs. For example, the UE basically skips candidates, staring from a candidate having a low index. However, the index which the UE starts to skip may be set differently for each UE based on the UE ID.

<Hashing Function for CSS>

In the NR system, different search space sets may operate as CSSs according to the characteristics of transmission information. For example, a search space set for RNTI scheduling, a search space set for paging scheduling, a search space set for a random access procedure, and a search space set for a TPC command, SI RNTI, or the like may have different configurations. For example, an NR technical specification, TS 38.213 defines search space types as listed in Table 6.

TABLE 6 a Type0-PDCCH common search space for a DCI format with CRC scrambled by a SI-RNTI on a primary cell;
a Type0A-PDCCH common search space for a DCI format with CRC scrambled by a SI-RNTI on a primary cell;
a Type1-PDCCH common search space for a DCI format with CRC scrambled by a RA-RNTI, or a TC-RNTI, or a C-RNTI on a primary cell;
a Type2-PDCCH common search space for a DCI format with CRC scrambled by a P-RNTI on a primary cell;
a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s); and
a UE-specific search space for a DCI format with CRC scrambled by C-RNTI or CS-RNTI(s).

The current NR standard defines the initial value of the hashing function for this CSS set as 0 (i.e., $Y_{p,kp}=0$). According to the NR standard, when different CSS sets are configured in the same CORESET in the same slot, blocking may increase, and scheduling flexibility may decrease.

To solve this problem, an embodiment of the present disclosure proposes that a different $Y_{p,kp}$ value is defined for each CSS type (or each RNTI used for monitoring in a CSS, or each monitoring periodicity). For example, the index of a CSS type may be defined as a $Y_{p,kp}$ value (e.g., $Y_{p,kp}=0$ for Type0, and $Y_{p,kp}=1$ for Type1).

<Method of Calculating Channel Estimation Complexity in CORESET Using Wideband RS>

A method of calculating a channel estimation complexity proportional to a CORESET BW for a CORESET using a wideband RS has been proposed before. In the method, the channel estimation complexity may be determined based on the BW and duration of the CORESET configured with the wideband RS.

For example, the network/UE may add a weight according to the BW of an actual CORESET, on the assumption that the channel estimation complexity of a specific CORESET BW (e.g., 24 RBs) configured with a wideband RS is X CCEs. For example, if the BW of CORESET "A" is Y RBs, and the channel estimation complexity for 24 RBs is 10 CCEs, the network/UE may calculate the channel estimation complexity of CORESET "A" to 10*Y/24, Floor (10*Y/24), or Ceiling (10*Y/24). Floor (10*Y/24) represents the largest integer less than or equal to 10*Y/24, and Ceiling (10*Y/24) represents the smallest integer equal to or larger than 10*Y/24.

This may be understood as predefining the complexity of a reference BW in the frequency domain and determining the actual channel estimation complexity by the ratio between the BW of the CORESET and the reference BW in order to obtain the channel estimation complexity of the CORESET using the wideband RS.

Additionally, the duration of the CORESET (i.e., the number of OFDM symbols in the CORESET) may be considered for the channel estimation complexity. For example, the above method may mean the channel estimation complexity for each symbol of the corresponding CORESET, and the channel estimation complexity of the entire CORESET may be a value obtained by multiplying the complexity calculated above by the number of OFDM symbols. For example, a reference duration for a channel estimation complexity may be set in the time domain, and the actual channel estimation complexity may be determined by a ratio between an actual CORESET duration and the reference duration.

For example, when a wideband RS is used, X (e.g., 1) symbol & Y (e.g., 24) RBs are predefined as a reference configuration, and the complexity of the reference configuration is predefined as Z (e.g., 10) CCEs. The UE may then derive the channel estimation complexity of the corresponding CORESET to be blind-decoded according to the configuration (e.g., BW or duration) of the CORESET.

Further, when a plurality of search space sets overlapping with each other in a CORESET using a wideband RS in a specific slot are to be monitored, preferably, the channel estimation complexity is not counted redundantly. Accordingly, when a plurality of search space sets are monitored in the same CORESET in one slot, and the corresponding CORESET uses a wideband RS, it is proposed that the number of CCEs derived for the CORESET is counted only once in the channel estimation complexity. For example, when a specific CORESET A is configured with a wideband RS, and search space sets A and B are associated with CORESET A, the total channel estimation complexity of search space sets A and B may be derived by applying the complexity calculated for CORESET A only once in a slot where monitoring occasions of search space sets A and B overlap with each other.

Additionally, the number of wideband RS CORESETs per slot may be limited as a method of handling the channel estimation complexity of a CORESET using a wideband RS, and CCE/blind decoding may be counted and blind decoding may be dropped, only in consideration of the channel estimation complexity of a narrowband RS CORESET in a corresponding slot. When a wideband RS is used, DFT-based channel estimation may be used as a channel estimation technique, and it may be difficult to compare the absolute complexities of MMSE-based channel estimation and DFT-based channel estimation commonly used in a CORESET using a narrowband RS. Therefore, it may be preferable to limit the number of wideband RS CORESETs without additionally calculating the channel estimation complexity of a wideband RS CORESET.

For example, the UE may assume that there are as many wideband RS CORESETs as a number (e.g., 1) per slot predefined or indicated by higher-layer signaling. Alternatively, if the number of wideband RS CORESETs to be blind-decoded in a specific slot is greater than the number predefined or indicated by higher-layer signaling, the UE may select a wideband CORESET to be blind-decoded. The foregoing proposed methods may be used to select a CORESET.

In another method, when the number of wideband CORESETs to be blind-decoded in a specific slot exceeds a specific value, the network/UE may derive the number of blind decodings and the number of CCEs by the above proposed method. When the limits on the number of blind decodings and the number of CCEs are exceeded, blind decoding may be dropped by the above proposed method. For example, when search space set A associated with a wideband RS CORESET and search space set B associated with a narrowband RS CORESET are simultaneously monitored in a specific slot, the UE may count the number of CCEs corresponding to the channel estimation complexity of search space set B. When the counted number of CCEs exceeds the limit, the network/UE may select a candidate to be dropped using the above proposed method. Herein, the network/UE may assume that candidates in the wideband RS CORESET have higher priorities or are not skipped. Since the limit on the maximum number of blind decodings is determined in consideration of a processing time for decoding, it may be desirable for the network/UE to determine whether the limit has been exceeded in consideration of all of candidates to be monitored in the wideband RS CORESET and the narrowband RS CORESET.

<Method of Deriving Channel Estimation Complexity in Consideration of REG Bundle Size>

It has been proposed above that when a narrow RS is used, an actual channel estimation complexity is derived by applying a weight corresponding to an REG bundle size to the number of CCEs derived from each CORESET.

In an embodiment of the present disclosure, a channel estimation complexity limit may be defined based on a specific REG bundle size. For example, it may be predefined that all UEs are capable of performing channel estimation on at least 48 CCEs in a given slot. 48 CCEs may result from assuming an REG bundle size of 6 REGs. It is also possible to set a reference REG bundle size to 2 or 3 REGs.

In this case, the UE may operate as follows.

Option 1) The channel estimation complexity of each CORESET is calculated with respect to the reference REG bundle size (the above proposed method).

When monitoring a plurality of CORESETs in a specific slot, the UE may calculate the total channel estimation complexity of the slot by calculating the channel estimation complexity of each CORESET with respect to the reference REG bundle size. To this end, a weight for each REG bundle size may be predefined.

Option 2) A channel estimation complexity is derived irrespective of an REG bundle size.

The UE may derive the channel estimation complexity (e.g., the number of CCEs) of each CORESET irrespective of an REG bundle size and compare the total number of CCEs in a corresponding slot (e.g., the number of CCEs defined based on a reference REG bundle size) with a channel estimation complexity limit, thereby determining whether to drop a candidate. In this case, the channel estimation complexity limit is preferably defined based on an REG bundle size of 6. In this case, when CORESETs with an REG bundle size of 2 or 3 overlap with each other in the same slot, it may be guaranteed that the channel estimation complexity does not exceed the channel estimation capability of the UE. On the other hand, when the reference REG bundle size is set to 2, channel estimation beyond the channel estimation capability of the UE may be required in a slot in which a CORESET with an REG bundle size of 3 or 6 is monitored. As a result, the performance or processing time of the UE may not be satisfied. When the reference REG bundle size is set to 2 or 3 as such, the UE/network may assume that a CORSET with a small REG bundle size has a high priority in a candidate drop rule. For example, the network/UE may first drop a candidate in a CORESET with a large REG bundle size.

Additionally, an REG bundle size may be additionally considered in Example 1) CORESET priority in the above proposed prioritization. For example, a CORESET with a large REG bundle size may have a low priority and thus may first be dropped.

<Maximum Number of BDs>

A maximum number of blind decodings to be performed in one slot may be defined for each SCS. For example, the maximum number of blind decodings may be set to 44 for a 15-kHz SCS.

As is the case with a channel estimation complexity, blind decodings beyond the blind decoding limit of the UE may be configured in a specific slot by a plurality of search space set configurations. To prevent this situation, the UE may assume that blind decodings are not configured beyond the maximum blind decoding limit at all. However, this may act as a factor decreasing the resource utilization of the network. For example, it may occur that 10 search space sets are to be monitored overlappingly in a specific slot. Therefore, the network may have to configure a small number of blind decodings in a slot in which search space sets overlap less with each other, to prevent the limit from being exceeded. Since this may seriously impair the scheduling flexibility of the network, overbooking may be allowed in a specific slot and specific blind decodings may be skipped in the slot.

For this operation, a method of counting the number of blind decodings in each slot is proposed. A decoding procedure occupies a major proportion of the complexity of blind decoding. After performing decoding only once for the same payload size, the UE may distinguish different DCIs by a DCI format indicator included in a specific field of the DCIs. Therefore, the following may be assumed in counting the number of blind decodings.

The UE counts candidates of different CORESETs as independent blind decodings.

The UE counts candidates which belong to the same CORESET but have different ALs as independent blind decodings.

The UE counts candidates which belong to the same AL of the same CORESET but have different CCE configurations as independent blind decodings.

The UE counts candidates which belong to the same CORESET, AL, and CCE configuration but have different DCI formats as independent blind decodings.

For example, the UE may count candidates identical in terms of CORESET, AL, and CCEs (despite different search space sets) as one blind decoding.

<Method of Selecting Candidate to Reduce Blind Decodings>

The rule of counting the number of blind decodings has been proposed above. Now, a method of configuring candidates in each search space set to allow a UE to perform more blind decodings will be proposed below.

According to the conventional method, when the UE configures candidates for a specific search space set in a specific CORESET, the UE should follow a hashing function defined in the standard. In this case, when a different number of candidates are defined in each search space set, the candidates of each search space set have a different CCE configuration. Even if the DCI format size is the same, since the candidates have different CCEs, the UE should perform blind decoding independently for each candidate, which may increase the number of blind decodings.

Accordingly, in one embodiment of the present disclosure, when there are a plurality of search space sets associated with the same CORESET, it may be signaled to the UE or determined according to a predefined rule whether another search space set follows the hashing function of a specific search space set.

For example, it is assumed that the monitoring occasions of search space set A associated with CORESET A and search space set B associated with CORESET B overlap with each other in a specific slot, and the size of a DCI format to be monitored is the same in search space set A and search space set B. In this case, the hashing function of a search space set with a larger number of candidates for a specific AL may be reused for a search space set with a smaller number of candidates. For example, it is assumed that candidates for AL2 are 0, 1, 2, and 3 for search space set A and 0 and 1 for search space set B. The UE may assume that candidates 0 and 2 of search space set A and candidates 0 and 1 of search space set B share resources, or the network may signal to the UE which candidates share resources.

Additionally, the network may indicate to the UE to follow a large DCI format size for search space sets configured for monitoring different DCI format sizes. For example, it is assumed that the UE monitors DCI having a DCI format size of 100 bits in search space set A, and DCI having a DCI format size of 80 bits in search space set B. The network may indicate to the UE to assume a DCI format size of 100 bits for search space set B (in slot(s) over which the monitoring occasions of the two search space sets overlap with each other). The remaining 20 bits may be defined using a specific pattern (e.g., zero padding). Such a configuration may be set in units of specific slot(s), a CORESET, or a search space set. For example, if the network configures assumption of the same DCI format size for a specific CORESET, and a plurality of search space sets are associated with the corresponding CORESET in a specific slot, the UE may assume the DCI format size of a search space set having the largest DCI format size for other search space sets.

The above operation may be defined on a DCI format basis or on an RNTI basis. For example, a UE configured to assume the same DCI format size for an interruption (INT)-RNTI and a configured scheduling (CS)-RNTI may perform blind decoding, assuming that the DCI format size of an RNTI corresponding to a smaller value among DCI format sizes set for the respective RNTIs to be the same as the DCI format size of an RNTI corresponding to a large value. However, the same DCI format size may be assumed only when two search space sets are monitored in the same slot and associated with the same CORESET.

Figure 4:
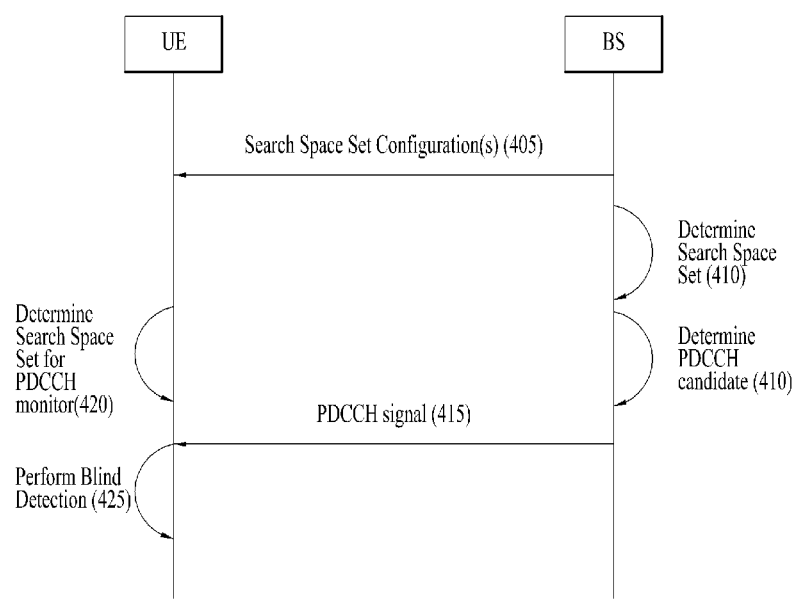
FIG. 4 illustrates a flow of a PDCCH signal transmission/reception method according to one embodiment of the present disclosure.

FIG. 4 illustrates a flow of the PDCCH signal transmission/reception method according to one embodiment of the present disclosure. FIG. 4 shows an exemplary implementation of the foregoing description. The present disclosure is not limited to the example in FIG. 4. Descriptions overlapping with those as described above may be omitted below.

Referring to FIG. 4, the BS transmits configurations for a plurality of search space sets to the UE 405. As described above, the configuration for each search space set may include information regarding the PDCCH monitoring periodicity, the number of candidates for each AL, the SS type (e.g., CSS/USS), and so on.

The BS may determine, based on the monitoring periodicity for each of the plurality of search space sets, search space sets for which the UE should monitor the PDCCH signal for a specific unit time (e.g., a specific slot). In a similar manner, the UE may determine, based on the monitoring periodicity for each of the plurality of search space sets, search space sets for which the UE should monitor the PDCCH signal for a specific unit time (e.g., a specific slot).

The BS may determine a PDCCH candidate for transmitting the PDCCH signal to the UE 410. Specifically, the BS identifies PDCCH candidates that the UE can monitor for a specific unit time. Then, the BS may select at least one of the PDCCH candidates that the UE can monitor, for the PDCCH signal transmission. When the number of PDCCH candidates and the number of CCEs included in the previously determined search space sets exceed the maximum number of candidates or the maximum number of CCEs that can be monitored by the UE, the BS may determine that only a part of the PDCCH candidates included in the determined search space sets can be monitored by the UE. In this connection, the BS assumes that the UE firstly monitors PDCCH candidates in a first search space set related to a common search space (CSS). Thus, the BS may determine PDCCH candidates for which the UE can monitor.

The BS selects PDCCH candidates can be monitored by the UE from the first search space set. Thereafter, the BS may determine additional PDCCH candidates that can be monitored by the UE until reaching the maximum number of the candidates, or until reaching the maximum number of CCEs, in a second search space set corresponding to a UE-specific search space (USS). The BS may determine the second search space set based on the search space set index.

The determined search space sets may include the first search space set and a plurality of second search space sets corresponding to the UE-specific search space (USS). The BS may assign a higher priority to a search space set having a lower search space set index among the second search space sets.

The BS may map the PDCCH signal to the selected PDCCH candidate and transmit the PDCCH signal 415.

The UE may perform blind detection to receive the PDCCH signal 425. When the number of PDCCH candidates and the number of control channel elements (CCEs) included in the determined search space sets exceed the maximum number of the candidates or the maximum number of the CCEs respectively, the UE may attempt to selectively blind-detect only a part of the PDCCH candidates included in the determined search space sets. In the selection of PDCCH candidates for the blind detection by the UE, the UE may firstly select PDCCH candidates from a first search space set related to a common search space (CSS) among the determined search space sets.

After the UE selects the PDCCH candidates from the first search space set, the UE may select additional PDCCH candidates for the blind detection until reaching the maximum number of the candidates or until reaching the maximum number of CCEs, from a second search space set corresponding to the UE-specific search space (USS). In one example, the UE may determine the second search space set based on a search space set index.

The search space sets determined by the UE may include the first search space set and a plurality of the second search space sets corresponding to the UE specific search space (USS). The UE may assign a higher priority to a search space set having a lower search space set index among the second search space sets related to the USS.

The maximum number of candidates and the maximum number of CCEs may be values determined based on a subcarrier spacing (SCS).

The maximum number of candidates may be related to the maximum number of blind decoding by the UE. The maximum number of CCEs may be related to the maximum channel estimation capability of the UE.

The number of CCEs included in the determined search space sets may be the number of CCEs that do not overlap with each other.

Figure 5:
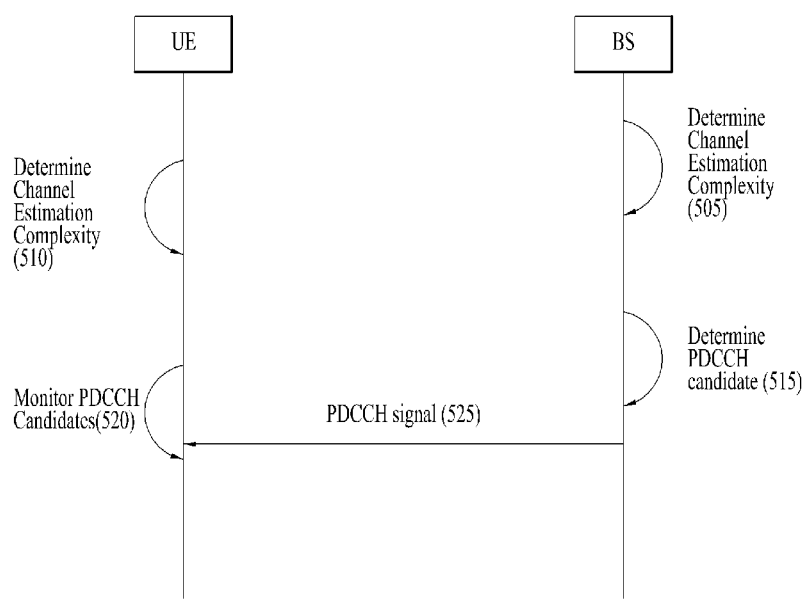
FIG. 5 illustrates a flow of a PDCCH signal transmission/reception method according to one embodiment of the present disclosure.

FIG. 5 is a flowchart illustrating a method of transmitting and receiving a PDCCH signal according to an embodiment of the present disclosure. FIG. 5 is an exemplary implementation of the above-described contents, which should not be construed as limiting the present disclosure. A description redundant with the foregoing descriptions may not be provided herein.

FIG. 5 does not necessarily need to be implemented separately from FIG. 4. For example, FIG. 5 may be understood as a more detailed implementation of the method of estimating a channel estimation capability (e.g., the number of CCEs) of a UE in the PDCCH transmission and reception method of FIG. 4.

Referring to FIG. 5, a BS determines a channel estimation complexity required for a UE to monitor PDCCH candidates in at least one CORESET during the duration of one slot (505). For example, the channel estimation complexity may be determined based on an REG bundle size configured for each of the at least one CORESET.

When the determined channel estimation complexity exceeds the channel estimation capability of the UE, the BS may determine some PDCCH candidates for which the UE skips monitoring and the remaining PDCCH candidates that the UE monitors (515).

The BS may transmit a PDCCH signal based on one of the remaining PDCCH candidates (525).

The UE may perform the following detection operation for PDCCH reception before receiving a PDCCH signal.

The UE determines a channel estimation complexity required to monitor PDCCH candidates in at least one CORESET during the duration of one slot (510). For example, the channel estimation complexity may be determined based on an REG bundle size configured for each of the at least one CORESET.

When the determined channel estimation complexity exceeds the channel estimation capability of the UE, the UE skips monitoring for a part of PDCCH candidates and monitors only the remaining PDCCH candidates (520).

The UE receives a PDCCH signal based on a result of monitoring the remaining PDCCH candidates (525).

For example, the channel estimation complexity may be represented as the number of CCEs. The UE or the BS may count the number of CCEs by applying a weight associated with an REG bundle size.

For example, the UE or the BS may determine a different channel estimation complexity depending on whether each of the at least one CORESET is configured with a wideband RS. The UE or the BS may determine the channel estimation complexity based on at least one of the number of symbols or the number of RBs in a CORSET configured with the wideband RS. The UE or the BS may determine the channel estimation complexity by applying a weight related to DFT-based channel estimation to the CORESET configured with the wideband RS. The UE or the BS may determine the channel estimation complexity by applying a weight related to MMSE-based channel estimation to a CORESET not configured with the wideband RS.

Figure 6:
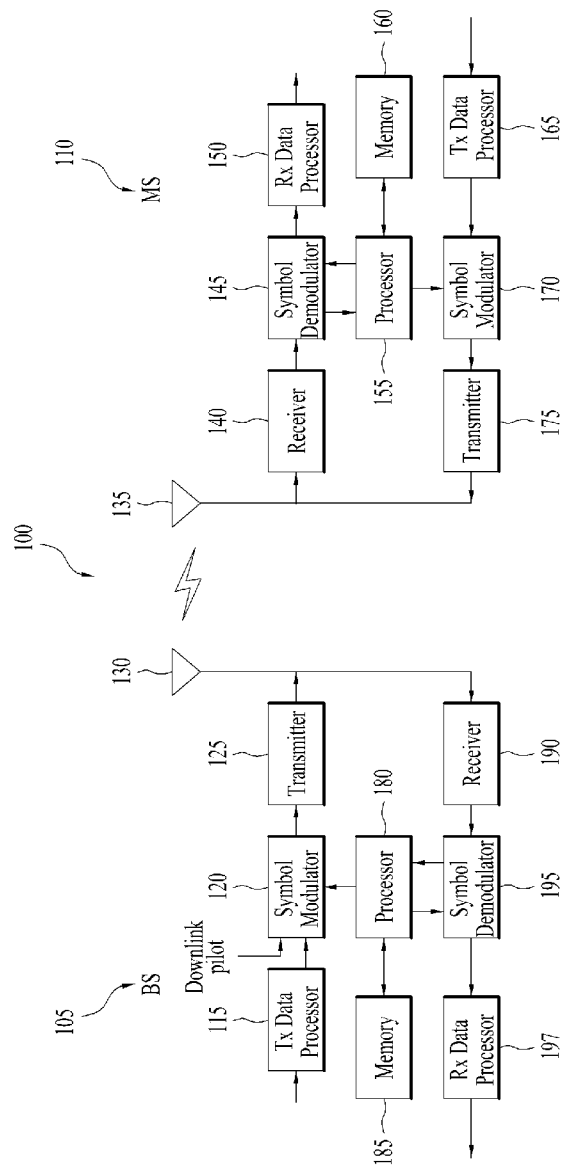
FIG. 6 illustrates a user equipment (UE) and a base station (BS) according to one embodiment of the present disclosure.

FIG. 6 is a block diagram illustrating a structure of a BS 105 and a UE 110 in a wireless communication system 100 according to an embodiment of the present disclosure. The structure of the BS 105 and the UE 110 of FIG. 5 are merely an embodiment of a BS and a UE for implementing the aforementioned method and the structure of a BS and a UE according to the present disclosure is not limited to FIG. 5. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In one example, the processor of the UE receives configurations for a plurality of search space sets from a BS via a receiver of the UE. The processor determines search space sets for which the UE should monitor the PDCCH signal for a specific unit time, based on the monitoring periodicity of each of the plurality of search space sets. When the number of PDCCH candidates and the number of control channel elements (CCEs) included in the determined search space sets exceed the maximum number of candidates or the maximum number of CCEs, respectively, the processor may attempt to blind-detect selectively only a part of the PDCCH candidates included in the determined search space sets. In selection of PDCCH candidates for the blind detection by the processor of the UE, the processor may firstly select PDCCH candidates from a first search space set related to a common search space (CSS) among the determined search space sets.

In one example, while the processor of the BS assumes that the UE preferentially monitors PDCCH candidates from the first search space set corresponding to the common search space (CSS) among the determined search space sets, the processor of the BS may determine PDCCH candidates that can be monitored by the UE. The processor of the BS may determine, based on the monitoring periodicity for each of the plurality of search space sets, search space sets for which the UE should monitor the PDCCH signal for a specific unit time (e.g., a specific slot). When the number of PDCCH candidates and the number of CCEs included in the previously determined search space sets exceed the maximum number of candidates or the maximum number of CCEs that can be monitored by the UE, the processor of the BS may determine that only a part of the PDCCH candidates included in the determined search space sets can be monitored by the UE. The processor of the BS selects at least one of PDCCH candidates can be monitored by the UE and transmit the PDCCH signal to the UE via the selected at least one. The processor of the BS may determine PDCCH candidates can be monitored by the UE under assumption that the UE may first select PDCCH candidates from a first search space set related to a common search space (CSS) among the previously determined search space sets.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

As described above, the present disclosure may be applied to various wireless communication systems.

The invention claimed is:

1. A method of receiving a physical downlink control channel (PDCCH) signal by a user equipment (UE) in a wireless communication system, the method comprising:
   determining a channel estimation complexity required for monitoring PDCCH candidates in at least one control resource set (CORESET) during one slot;
   based on the determined channel estimation complexity exceeding a channel estimation capability of the UE, skipping the monitoring of a portion of the PDCCH candidates and monitoring only the remaining PDCCH candidates; and
   receiving a PDCCH signal based on a result of monitoring the remaining PDCCH candidates,
   wherein the channel estimation complexity is determined based on a resource element group (REG) bundle size configured for each of the at least one CORESET, and
   wherein the UE determines the channel estimation complexity differently based on whether each of the at least one CORESET is configured with a wideband (WB) reference signal (RS).

2. The method according to claim 1, wherein the channel estimation complexity is represented as the number of control channel elements (CCEs), and the UE counts the number of CCEs by applying a weight associated with the REG bundle size.

3. The method according to claim 1, wherein as the REG bundle size is larger, the UE determines the channel estimation complexity to be larger.

4. The method according to claim 1, wherein the UE determines the channel estimation complexity for the CORESET configured with the WB RS based on at least one of the number of symbols or the number of resource blocks in the CORESET configured with the WB RS.

5. The method according to claim 4, wherein the UE determines the channel estimation complexity for the CORESET configured with the WB RS by applying a weight related to discrete Fourier transform (DFT)-based channel estimation, and the channel estimation complexity for a CORESET not configured with the WB RS by applying a weight related to minimum mean squared error (MMSE)-related channel estimation.

6. A method of transmitting a physical downlink control channel (PDCCH) signal by a base station (BS) in a wireless communication system, the method comprising:
   determining a channel estimation complexity required for a user equipment (UE) to monitor PDCCH candidates in at least one control resource set (CORESET) during one slot;
   based on the determined channel estimation complexity exceeding a channel estimation capability of the UE, determining a portion of the PDCCH candidates for which the UE will skip monitoring and the remaining PDCCH candidates the UE will monitor; and
   transmitting a PDCCH signal based on one of the remaining PDCCH candidates,
   wherein the channel estimation complexity is determined based on a resource element group (REG) bundle size configured for each of the at least one CORESET, and
   wherein the BS determines the channel estimation complexity differently based on whether each of the at least one CORESET is configured with a wideband (WB) reference signal (RS).

7. The method according to claim 6, wherein the channel estimation complexity is represented as the number of control channel elements (CCEs), and the BS counts the number of CCEs by applying a weight associated with the REG bundle size.

8. The method according to claim 6, wherein as the REG bundle size is larger, the BS determines the channel estimation complexity to be larger.

9. The method according to claim 6, wherein the BS determines the channel estimation complexity for the CORESET configured with the WB RS based on at least one of the number of symbols or the number of resource blocks in the CORESET configured with the WB RS.

10. The method according to claim 9, wherein the BS determines the channel estimation complexity for the CORESET configured with the WB RS by applying a weight related to discrete Fourier transform (DFT)-based channel estimation, and the channel estimation complexity for a CORESET not configured with the WB RS by applying a weight related to minimum mean squared error (MMSE)-related channel estimation.

11. A user equipment (UE) configured for receiving a physical downlink control channel (PDCCH) signal, the UE comprising:
   a transceiver; and
   a processor configured to control the transceiver,
   wherein the processor is further configured to determine a channel estimation complexity required for monitoring PDCCH candidates in at least one control resource set (CORESET) during one slot, and based on the determined channel estimation complexity exceeding a channel estimation capability of the UE, skip the monitoring of a portion of the PDCCH candidates and monitor only the remaining PDCCH candidates, and receive a PDCCH signal based on a result of monitoring the remaining PDCCH candidates, and wherein the channel estimation complexity is determined based on a resource element group (REG) bundle size configured for each of the at least one CORESET, and wherein the processor is configured to determine the channel estimation complexity differently based on whether each of the at least one CORESET is configured with a wideband (WB) reference signal (RS).

12. The UE according to claim 11, wherein the UE is capable of communicating with at least one of another UE, a UE related to an autonomous driving vehicle, a base station or a network.

13. A base station (BS) configured for transmitting a physical downlink control channel (PDCCH) signal, the BS comprising:

a transceiver; and a processor configured to control the transceiver, wherein the processor is further configured to determine a channel estimation complexity required for a user equipment (UE) to monitor PDCCH candidates in at least one control resource set (CORESET) during one slot, and based on the determined channel estimation complexity exceeding a channel estimation capability of the UE, determine a portion of the PDCCH candidates for which the UE will skip monitoring and the remaining PDCCH candidates the UE will monitor, and transmit a PDCCH signal based on one of the remaining PDCCH candidates, and wherein the channel estimation complexity is determined based on a resource element group (REG) bundle size configured for each of the at least one CORESET, and wherein the processor is configured to determine the channel estimation complexity differently based on whether each of the at least one CORESET is configured with a wideband (WB) reference signal (RS).

* * * * *